United States Patent
Xi et al.

(10) Patent No.: US 9,407,404 B2
(45) Date of Patent: Aug. 2, 2016

(54) MANAGING CONTROL SIGNALING OVERHEAD FOR MULTI-CARRIER HSDPA

(75) Inventors: Fengjun Xi, Huntington Station, NY (US); Lujing Cai, Morganville, NJ (US); Joseph S. Levy, Merrick, NY (US); Benoit Pelletier, Roxboro (CA); Hong O. Zhang, Manalapan, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 663 days.

(21) Appl. No.: 13/371,320

(22) Filed: Feb. 10, 2012

(65) Prior Publication Data

US 2012/0287869 A1 Nov. 15, 2012

Related U.S. Application Data

(60) Provisional application No. 61/441,949, filed on Feb. 11, 2011, provisional application No. 61/480,804, filed on Apr. 29, 2011, provisional application No. 61/522,972, filed on Aug. 12, 2011.

(51) Int. Cl.
*H04W 4/00* (2009.01)
*H04L 5/00* (2006.01)

(52) U.S. Cl.
CPC .............. *H04L 5/003* (2013.01); *H04L 5/001* (2013.01); *H04L 5/0098* (2013.01); *H04L 5/0058* (2013.01)

(58) Field of Classification Search
USPC .......................... 370/328, 338, 401, 465, 329
See application file for complete search history.

(56) References Cited

U.S. PATENT DOCUMENTS

2008/0130795 A1* 6/2008 Chang et al. .................. 375/329
2010/0130137 A1* 5/2010 Pelletier et al. ................. 455/68
(Continued)

FOREIGN PATENT DOCUMENTS

EP           1916790 A1     4/2008
JP       2012-510207 A     4/2012
(Continued)

OTHER PUBLICATIONS

3rd Generation Partnership Project (3GPP), R1-094529, "Considerations on Some Open Issues for 4-carrier HSDPA Operation", Huawei, 3GPP TSG RAN WG1 #59, Jeju, Korea, Nov. 9-13, 2009, 4 pages.
(Continued)

*Primary Examiner* — Ricky Ngo
*Assistant Examiner* — Christine Ng
(74) *Attorney, Agent, or Firm* — Condo Roccia Kotpiw LLP

(57) ABSTRACT

Systems and methods for managing control signaling overhead for a multi-carrier HSDPA (MC-HSDPA) may be disclosed. In particular, a plurality of downlink carriers may be received and bundled or paired. Configuration information indicative of the bundling may then be generated and transmitted. Additionally, one or more components such as antennas, user equipment (UE), and the like may receive an indication of a configuration or state via a high speed shared control channel (HS-SCCH) order where the indication includes order bits and order types and the configuration may be applied to activate and/or deactivate the components or operations such as uplink closed-loop transmit diversity (CLTD), uplink multiple-input multiple-output (MIMO). The order bits and/or order types may also be extended to support the activation/deactivation of additional carriers of MC-HSDPA.

12 Claims, 17 Drawing Sheets

(56) References Cited

U.S. PATENT DOCUMENTS

| | | | | |
|---|---|---|---|---|
| 2011/0243264 A1* | 10/2011 | Hultell et al. | | 375/260 |
| 2012/0188889 A1* | 7/2012 | Sambhwani et al. | | 370/252 |

FOREIGN PATENT DOCUMENTS

| | | |
|---|---|---|
| JP | 2014-507866 A | 3/2014 |
| WO | WO 2012/097001 A1 | 7/2012 |

OTHER PUBLICATIONS

3$^{rd}$ Generation Partnership Project (3GPP), R1-110118, "Physical Layer Design Considerations for CLTD", Qualcomm Incorporated, 3GPP TSG RAN WG1 Meeting #63bis Dublin, Ireland, Jan. 17-21, 2011, 1-8.

3rd Generation Partnership Project (3GPP), R1-110218, "Considerations for 8C-HSDPA", Alcatel-Lucent, Alcatel-Lucent Shanghai Bell, 3GPP TSG-RAN WG1 Meeting #63bis, Dublin, Ireland, Jan. 17-21, 2011, 3 pages.

3rd Generation Partnership Project (3GPP), R1-110489, "On the Design of Uplink Closed Loop Transmit Diversity for HSUPA", Ericsson, ST-Ericsson, 3GPP TSG RAN WG1 Meeting #63bis Dublin, Ireland, Jan. 17-21, 2011, 6 pages.

3rd Generation Partnership Project (3GPP), R1-110491, "Carrier (de)activation for 8-Carrier HSDPA", Ericsson, ST-Ericsson, 3GPP TSG RAN WG1 Meeting #63bis Dublin, Ireland, Jan. 17-21, 2011, 6 pages.

3rd Generation Partnership Project (3GPP), R1-110520, "Some Aspects on 8C-HSDPA", ZTE, 3GPP TSG RAN WG1 Meeting #63bis Dublin, Ireland, Jan. 17-21, 2011, 8 pages.

3rd Generation Partnership Project (3GPP), R2-110291, "Band/Carrier Combination Signaling for 4C-HSDPA and 8C-HSDPA", Nokia Siemens Networks, Renesas Electronics Europe, Nokia Corporation, 3GPP TSG-RAN WG2 Meeting #72bis, Dublin, Ireland, Jan. 17-21, 2011, 5 pages.

3$^{rd}$ Generation Partnership Project (3GPP), R1-110184, "Discussion on 8-carrier HSDPA", 5.3-8 Carrier HSDPA, Renesas Electronics Europe, 3GPP TSG-RAN WG1 Meeting #63bis, Dublin, Ireland, Jan. 17-21, 2011, 3 pages.

3rd Generation Partnership Project (3GPP), RP-101419, "Eight carrier HSDPA", Ericsson, 3GPP Working Procedures, 3GPP TR 21.900, 14pp.

3rd Generation Partnership Project (3GPP), R1-111533, "Dynamic control of UL CLTD via HS-SCCH orders", Qualcomm Inc., 3GPP TSG-RAN WG1 Meeting #65, Barcelona, Spain, May 9-13, 2011, 5 pages.

3rd Generation Partnership Project (3GPP), R1-111753, "Carrier (de)activation for 8C-HSDPA", Ericsson, 3GPP TSG-RAN WG1 Meeting #65, Barcelona, Spain, May 9-13, 2011, 5 pages.

3rd Generation Partnership Project (3GPP), TS 25.211, V10.0.0, "3$^{rd}$ Generation Partnership Project; Technical Specification Group Radio Access Network; Physical channels and mapping of transport channels onto physical channels (FDD), Release 10", Sep. 2010, 58 pages.

3rd Generation Partnership Project (3GPP), TS 25.214, V10.6.0, "3$^{rd}$ Generation Partnership Project; Technical Specification Group Radio Access Network; Physical layer procedures (FDD), Release 10", Mar. 2012, 100pages.

European Telecommunications Standards Institute (ETSI), TS 125 212, V10.1.0, "Universal Mobile Telecommunications System (UMTS); Multiplexing and channel coding (FDD), Release 10", May 2011, 118 pages.

European Telecommunications Standards Institute (ETSI), TS 125 213, V10.0.0, "Universal Mobile Telecommunications System (UMTS); Spreading and modulation (FDD), Release 10", May 2011, 41 pages.

3$^{rd}$ Generation Partnership Project (3GPP), TS 25.212, V10.1.0, 3$^{rd}$ Gerneration Partnership Project; Technical Specification Group Radio Access Network; Multiplexing and channel coding (FDD), Dec. 2010, 116 pages.

3rd Generation Partnership Project (3GPP), R1-110302, "Feedback Channel for Uplink Closed Loop Transmit Diversity", ZTE, 3GPP TSG RAN WG1 Meeting #63bis, Dublin, Ireland, Jan. 17-21, 2011, 6 pages.

3rd Generation Partnership Project (3GPP), R1-110995, "Activation and Deactivation for 8C-HSDPA", Huawei, HiSilicon, 3GPP TSG RAN WG1 Meeting #64, Taipei, Feb. 21-25, 2011, 3 pages.

3rd Generation Partnership Project (3GPP), R1-111012, "Carrier Activation/Deactivation for 8-Carrier HSDPA", InterDigital Communications, LLC, 3GPP TSG-RAN WG1 Meeting #64, Taipei, Taiwan, Feb. 21-25, 2011, 9 pages.

3rd Generation Partnership Project (3GPP), R1-112968, "HS-SCCH Orders for UL CLTD Configurations (de-)Activation", Huawei, HiSilicon, 3GPP TSG RAN WG1 Meeting #66bis, Zhuhai, China, Oct. 10-14, 2011, 1 page.

* cited by examiner

MANAGING CONTROL SIGNALING OVERHEAD FOR MULTI-CARRIER HSDPA

CROSS-REFERENCE

This application claims benefit under 35 U.S.C. §.119(e) of provisional U.S. Patent Application Nos. 61/441,949, 61/480, 804, and 61/522,972, the disclosures of which are incorporated herein by reference.

BACKGROUND

Typically, wireless communication systems provide data bandwidth for end users operating a mobile device such as a mobile phone, laptop, tablet, and the like such that the end users may access email, web content, and the like via the mobile device. Currently, the demand from end users for such mobile devices and data bandwidth has continued to increase. Unfortunately, data bandwidth currently available today tends to be limited and does not meet the demand from the end users. As such, a number of wireless communication techniques have been developed to improve data bandwidth. One such technique included in wireless communication systems to improve data bandwidth includes dual-cell High-Speed Downlink Packet Access (HSDPA) or multi-carrier HSDPA (MC-HSDPA). Such dual-cell or MC-HSDPA may provide the simultaneous use of multiple HSDPA carriers or cells such that the available per user data rate and bandwidth may be increased. For example, such dual-cell HSDPA may provide the simultaneous use of two cells or carriers in a HSDPA operation such that the per user data rate and bandwidth may be doubled from a single cell HSDPA. Likewise, MC-HSDPA may provide the simultaneous use of, for example, four HSDPA downlink carriers or cells (i.e. 4C-HSDPA) doubling the per user data rate or bandwidth from a dual-cell HSDPA, and eight carrier HSDPA (i.e. 8C-HSDPA) further doubling the available per user data rate or bandwidth.

Although the increased number of carriers for HSDPA operations (e.g. eight-carrier HSDPA (i.e. 8C-HSDPA)) enables higher downlink carrier throughput and improved user data rates or bandwidth, feedback and/or control information used to support such additional carriers and the load therefor also increases by approximately the same factor as the increased/additional bandwidth provided by the downlink carriers. Additionally/Furthermore, HS-SCCH orders for activation and/or deactivation of UL CLTD or secondary cells used to support such additional carriers (e.g. carriers 5-8 in 8C-HSDPA) may also increase. Unfortunately, current techniques may not be suitable to reduce the load associated with the increased amount feedback and/or control information and may be insufficient to activate and/or deactivate UL CLTD(s) or secondary cells associated with the additional carriers (e.g. the 5-8 additional carriers associated with 8C-HSDPA).

SUMMARY

Systems and methods for managing control signaling overhead for a multi-carrier HSDPA are disclosed. According to an aspect, a method includes receiving a plurality of downlink carriers. Further, the method includes bundling the plurality of downlink carriers. The method also includes using a mapping technique to unbundle the downlink carriers. The method may include signaling the bundling of the downlink carriers to UE.

Additionally, activation/deactivation of uplink (UL) closed-loop transmit diversity (CLTD) and/or MIMO, as well as control of UE antenna operations may be provided. For example, High Speed Shared Control Channel (HS-SCCH) orders may be used to activate/deactivate UL CLTD/MIMO and/or control UE antenna operation. One or more bits and/or orders may be utilized to activate/deactivate UL CLTD/MIMO antenna configurations. A state based technique for determining UL CLTD/MIMO antenna configurations may be implemented. An indication of the state may be sent via a HS-SCCH order. In an example, a single bit may be used to activate/deactivation UL CLTD. Separate bits, for example several single bits, may be used for UL CLTD activation/deactivation, antenna selection, S-DPCCH activation/deactivation, and/or UL MIMO activation/deactivation. Control of UE pre-coding tables may also be signaled, for example via HS-SCCH order(s).

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

Figure 1A:
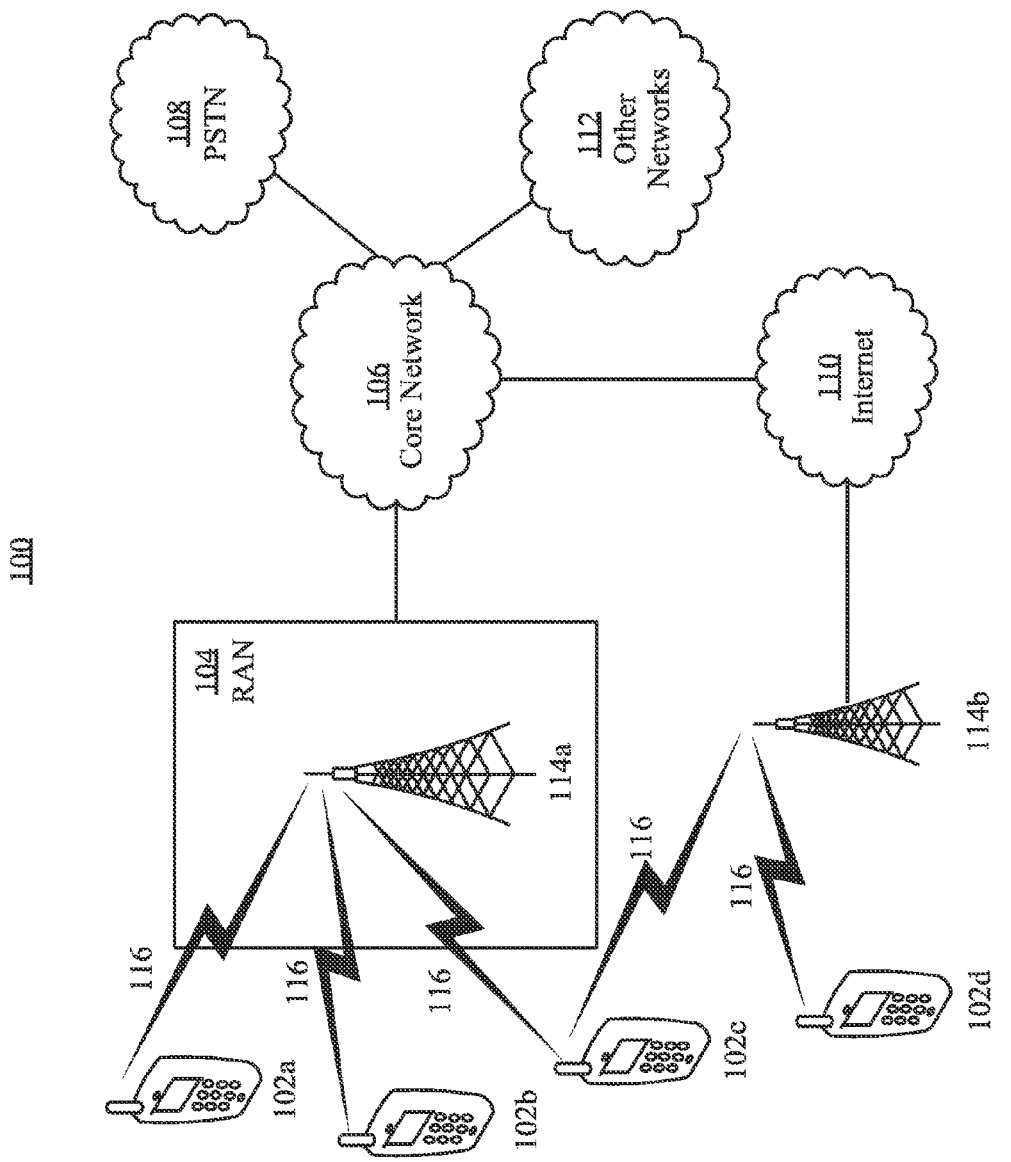
FIG. 1A depicts a diagram of an example communications system in which one or more disclosed embodiments may be implemented.

Systems and methods are disclosed herein for managing feedback and/or control information and signaling in multi-carrier HSDPA (MC-HSDPA) and/or for providing channel orders such as High Speed Shared Control Channel (HS-SCCH) orders for activation and/or deactivation of uplink closed-loop transmit diversity (UL CLTD), uplink multiple-input multiple-output (UL MIMO), or secondary cells (or carriers) in MC-HSDPA. As described above, in current wireless communication systems, the data bandwidth available for each user tends to be limited and typically does not meet the demand from the users. As such, to increase or improve the data bandwidth, the number of carriers used in HSDPA may be increased. For example, instead of a single carrier, multi-carrier HSDPA (MC-HSDPA) may be implemented in a wireless communication system such that two carriers, four carriers, eight carriers, and the like may be used to transmit data instead of one carrier thereby increasing the data bandwidth available. Unfortunately, as described above, the feedback and/or control information and signaling used to support such additional carriers and the load therefor may also increase. For example, the amount of L1 control information and signaling that may be used to support additional carriers (e.g. carriers 5-8) in MC-HSDPA may increase by approximately the same factor as the increased number of carriers if, for example, the current high speed (HS) channel structure such as HS-SCCH, HS-DPCCH, and the like and scheduling functionality may be used. Additionally, the current HS channel structure such as HS-SCCH may be insufficient to activate and/or deactivate UL CLTD(s) or secondary cells associated with the additional carriers (e.g. the 5-8 additional carriers associated with 8C-HSDPA).

To reduce the load associated with the feedback and/or control information for the additional carriers in MC-HSDPA, various methods and/or techniques may be implemented. One such method and/or technique may include using a High-Speed Dedicated Physical Control Channel (HS-DPCCH) with a higher capacity and a lower spread factor (SF) to transmit and/or signal feedback and/or control information. For example, for an eight-carrier HSDPA (i.e. 8C-HSDPA), a HS-DPCCH with a higher capacity (e.g. with a payload on HS-DPCCH such as HARQ-ACK/NACK and Channel Quality Indicator (CQI) and/or CQI/Precoding Channel Indicator (PCI) that may be doubled for 8C-HSDPA compared to 4C-HSDPA) and a SF of 64 may be used to transmit and/or signal feedback and/or control information. Unfortunately, the transport power from, for example, a UE that may be used to implement such a method and/or technique also increases with the increase in the number of carriers. For example, the transport power from a UE that may use 8C-HSDPA may be higher than the transport power from a UE that may use 4C-HSDPA when using HS-DPCCH with a higher capacity and a lower SF to transmit and/or signal the additional feedback and/or control information for the additional carriers (e.g. carriers 5-8).

Another such method and/or technique may include spreading the load associated with the feedback and/or control information over multiple HS-DPCCHs when, for example, transmitting and/or signaling the feedback and/or control information. For example, the increased feedback and/or control information for MC-HSDPA (e.g. 8C-HSDPA) may be spread among two or more HS-DPCCHs. Unfortunately, the use of multiple HS-DPCCHs for spreading the load associated with the increased amount of feedback and/or control information may result in a higher or increased Cubic Metric (CM) that may be based on a UE transmit channel configuration and may be defined by $$CM = \mathrm{CEIL}\,\{[20*\log 10((v\_\mathrm{norm}^3)_{rms}) - 20*\log 10((v\_\mathrm{norm\_ref}^3)_{rms})]/k,\,0.5\}$$

and/or reduced coverage areas.

Another such method and/or technique as disclosed herein may include paring and/or bundling one or more of the carriers in or associated with MC-HSDPA to reduce the amount of feedback and/or control information transmitted and/or signaled. For example, two or more downlink carriers may be paired or bundled and mapped together to carry a single Transport Block (TrBlk) such that the feedback and/or control information for the pair of carriers associated with a single TrBlk may be reduced (e.g. the amount of feedback and/or control information, the load associated with the feedback and/or control information, and/or scheduling gain may be reduced). Additionally, a HS-DPCCH with, for example, a higher SF such as an SF of 128 may be used to signal and/or feedback such information such that the transport power may be the same or similar to the transmit power currently used by a UE in a wireless communication system and, thus, may not be increased as described above. For example, by pairing and/or bundling multiple carriers together and reducing the amount of feedback and/or control information, a HS-DPCCH with a higher SF such as a SF of 128 included a wireless communication system that may implement four downlink carrier for HSDPA (i.e. 4C-HSDPA) may be reused when the number of downlink carriers used for HSDPA may be increased, for example, to eight downlink carriers (i.e. 8C-HSDPA), and, as such, the power transmit used by a UE may be similar regardless of the number of downlink carriers increasing.

Along with pairing and/or bundling multiple carriers in MC-HSDPA, downlink (DL) control signaling such as HS-SCCH(s) for data demodulation and/or HS-SCCH order(s) for activation and/or deactivation of secondary serving HS-DSCH cells and the secondary uplink frequency may also be redesigned or optimized to further improve efficiency and decrease overhead using the systems and/or methods as disclosed herein. Additionally, HS-SCCH order(s) for activation and/or deactivation of uplink closed-loop transmit diversity (UL CLTD) and uplink MIMO (UL MIMO) may also be optimized to further improve efficiency and reduce overhead using the systems and methods disclosed herein.

FIG. 1A is a diagram of an example communications system 100 in which one or more disclosed embodiments for managing feedback and/or control information and signaling in multi-carrier HSDPA (MC-HSDPA) and/or for providing channel orders such as High Speed Shared Control Channel (HS-SCCH) orders for activation and/or deactivation of uplink closed-loop transmit diversity (UL CLTD), uplink multiple-input multiple-output (UL MIMO), or secondary cells that may be used to support carriers used in MC-HSDPA may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
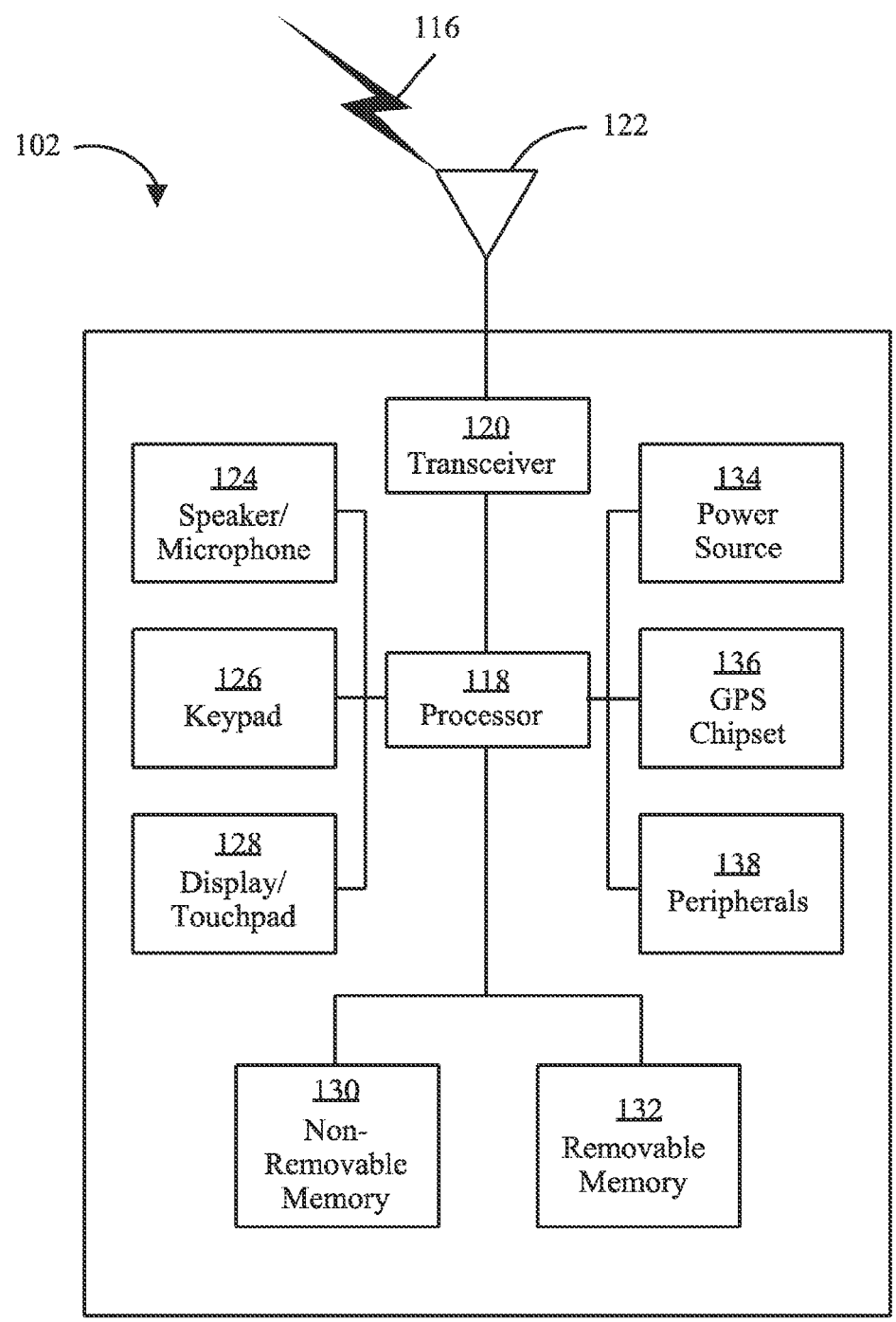
FIG. 1B depicts a system diagram of an example wireless transmit/receive unit (WTRU) that may be used within the communications system illustrated in FIG. 1A.

FIG. 1B is a system diagram of an example WTRU 102. The WTRU 102 shown in FIG. 1B may be used in one or more disclosed embodiments for managing feedback and/or control information and signaling in multi-carrier HSDPA (MC-HSDPA) and/or for providing channel orders such as High Speed Shared Control Channel (HS-SCCH) orders for activation and/or deactivation of uplink closed-loop transmit diversity (UL CLTD), uplink multiple-input multiple-output (UL MIMO), or secondary cells that may be used to support carriers used in MC-HSDPA. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
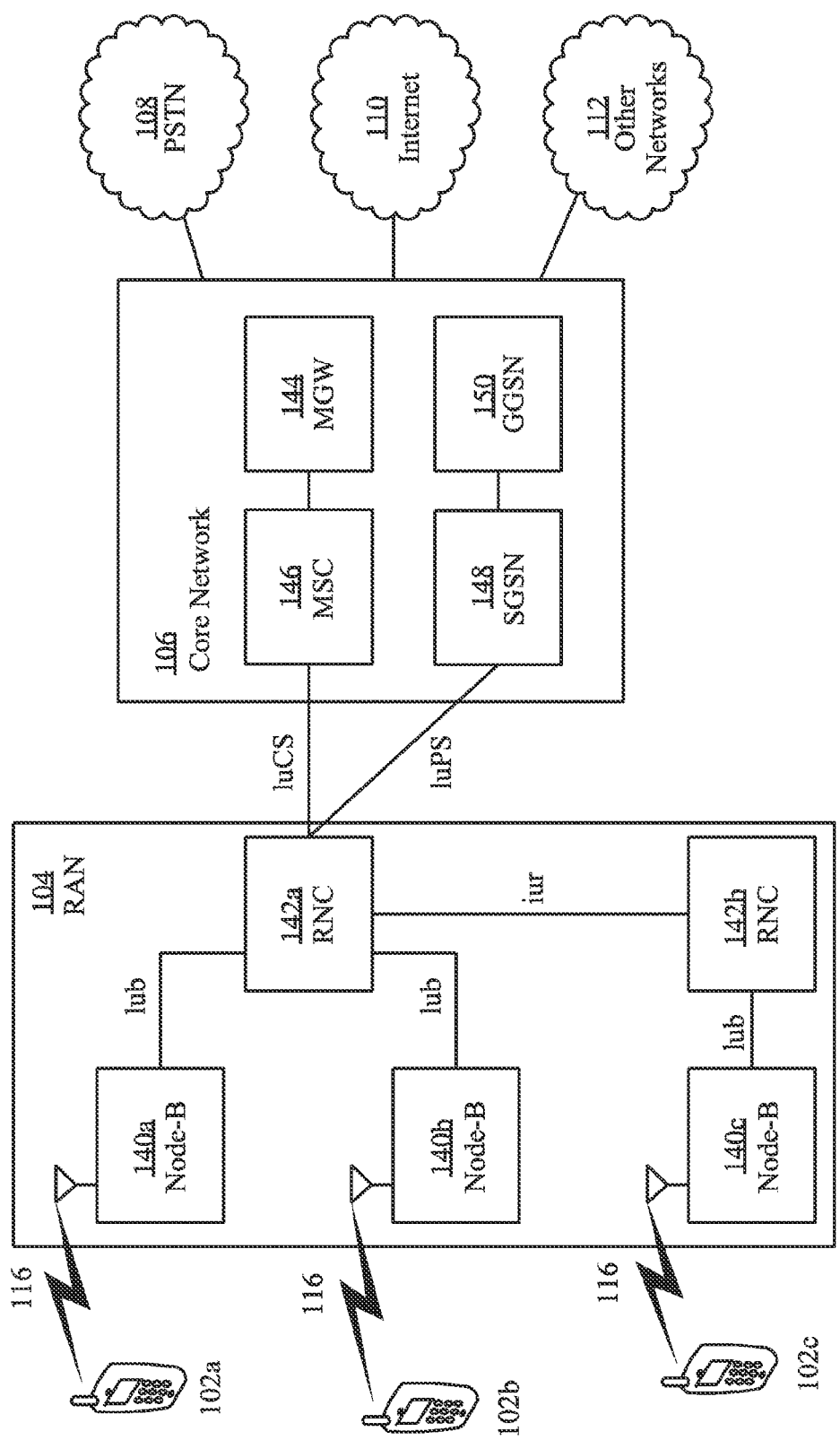
FIG. 1C depicts a system diagram of an example radio access network and an example core network that may be used within the communications system illustrated in FIG. 1A.

FIG. 1C is a system diagram of the RAN 104 and the core network 106 according to an embodiment. The RAN 104 and the core network 106 shown in FIG. 1C may be used in one or more embodiments disclosed herein for managing feedback and/or control information and signaling in multi-carrier HSDPA (MC-HSDPA) and/or for providing channel orders such as High Speed Shared Control Channel (HS-SCCH) orders for activation and/or deactivation of uplink closed-loop transmit diversity (UL CLTD), uplink multiple-input multiple-output (UL MIMO), or secondary cells that may be used to support carriers used in MC-HSDPA. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a bgateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
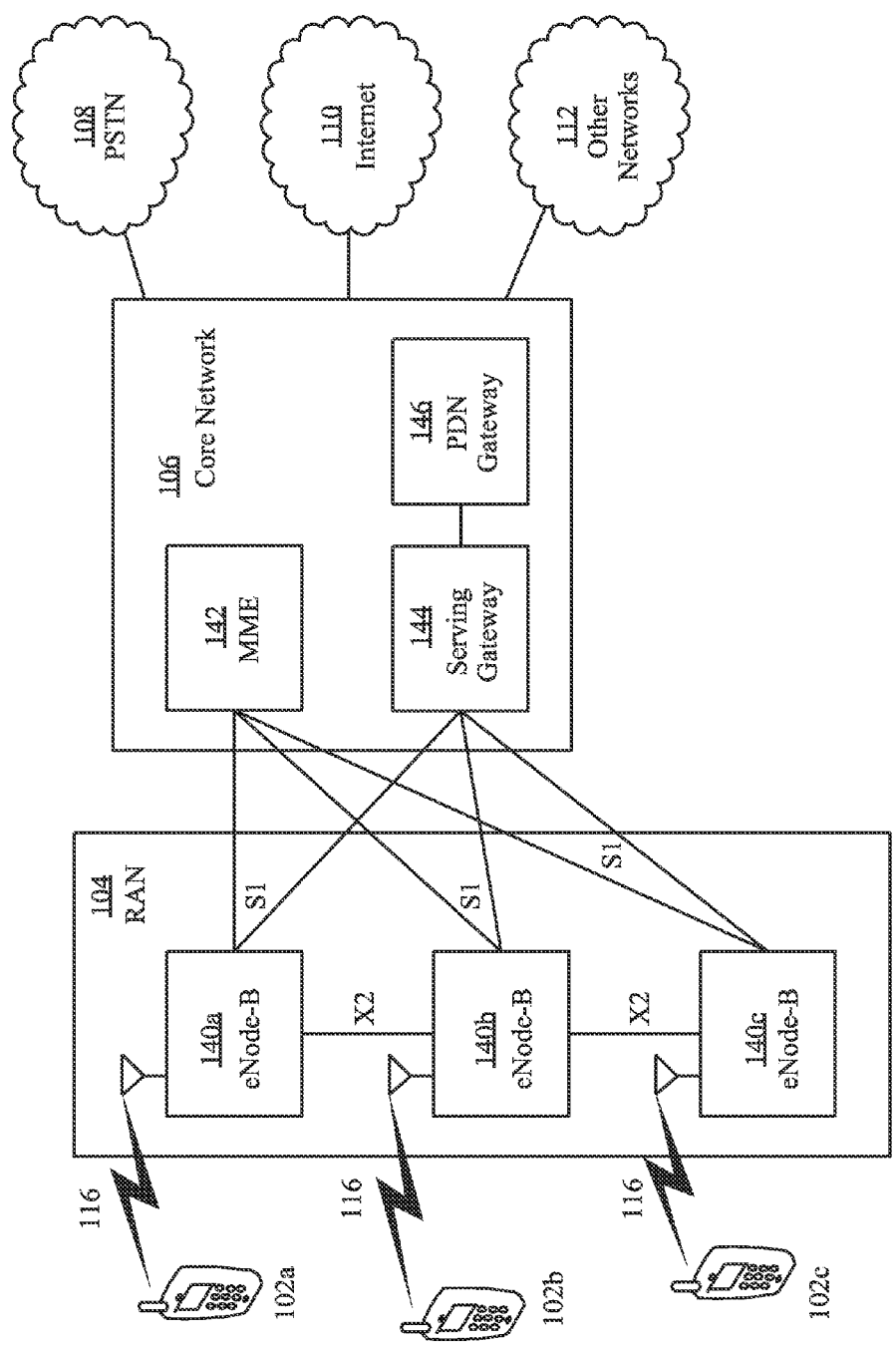
FIG. 1D depicts a system diagram of another example radio access network and an example core network that may be used within the communications system illustrated in FIG. 1A.

FIG. 1D is a system diagram of the RAN 104 and the core network 106 according to an embodiment. The RAN 104 and the core network 106 shown in FIG. 1D may also be used in one or more embodiments disclosed herein for managing feedback and/or control information and signaling in multi-carrier HSDPA (MC-HSDPA) and/or for providing channel orders such as High Speed Shared Control Channel (HS-SCCH) orders for activation and/or deactivation of uplink closed-loop transmit diversity (UL CLTD), uplink multiple-input multiple-output (UL MIMO), or secondary cells that may be used to support carriers used in MC-HSDPA. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1D, the eNode-Bs 140a, 140b, 140c may communicate with one another over an X2 interface.

The core network 106 shown in FIG. 1D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
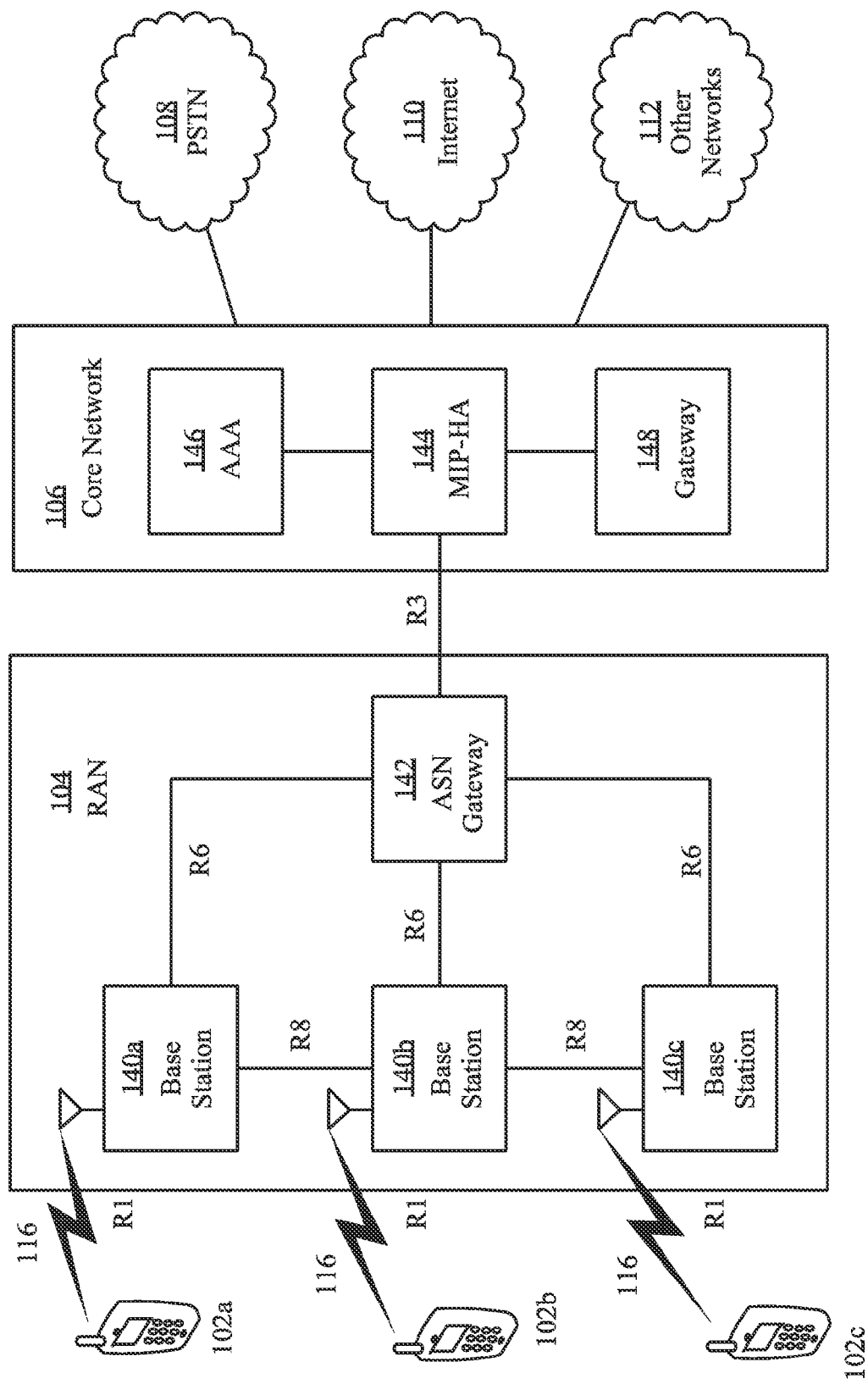
FIG. 1E depicts a system diagram of another example radio access network and an example core network that may be used within the communications system illustrated in FIG. 1A.

FIG. 1E is a system diagram of the RAN 104 and the core network 106 according to an embodiment. The RAN 104 and the core network 106 shown in FIG. 1E may be used in one or more embodiments disclosed herein for managing feedback and/or control information and signaling in multi-carrier HSDPA (MC-HSDPA) and/or for providing channel orders such as High Speed Shared Control Channel (HS-SCCH) orders for activation and/or deactivation of uplink closed-loop transmit diversity (UL CLTD), uplink multiple-input multiple-output (UL MIMO), or secondary cells that may be used to support carriers used in MC-HSDPA. Additionally, the RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it may be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1E, it may be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

As described above, in multi-carrier High-Speed Downlink Packet Access (MC-HSDPA, one or more of the carriers such as the downlink carriers may be bundled or paired together to reduce signaling overhead and enable the use of currently available HS-DPCCH formats and HS-SCCH orders.

Figure 2:
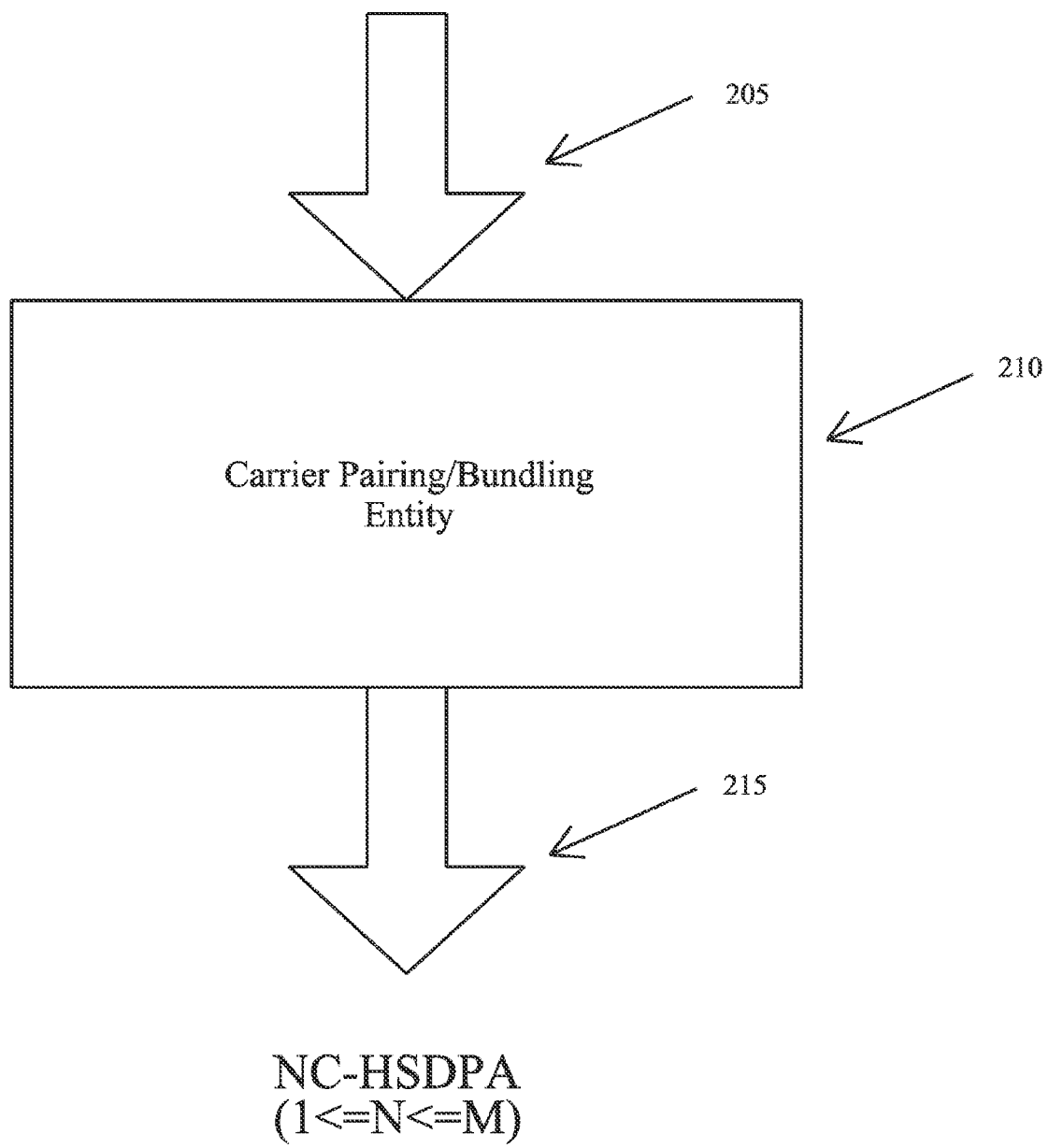
FIG. 2 illustrates a flow diagram of an example embodiment of pairing and/or bundling carriers in MC-HSDPA.

FIG. 2 illustrates a flow diagram of an example embodiment of pairing and/or bundling carriers in MC-HSDPA. For example, as shown in FIG. 2, M carriers may be received at 205 and bundled or paired into N entities at 210. According to an embodiment, N may be a non-zero value less than or equal to M. For example, in one embodiment, eight downlink carriers in 8C-HSDPA may be bundled and/or paired together into 4 entities such that the uplink (UL)/downlink (DL) control signaling overhead including, for example, the UL HS-DPCCH feedback load and DL HS-SCCH/HS-SCCH orders may be reduced and the currently available formats such as 4C-HSDPA may be reused. Control information indicative of the bundling or pairing may also be generated (e.g. at 210 when bundling or pairing the carriers). After bundling or pairing the downlink carriers (e.g. as shown in FIG. 2), the control information indicative of the bundling or pairing may transmitted at 215 (e.g. to a UE, which will be described in more detail below). Additionally, control signaling (e.g. including the control information) for each entity may be treated as if the control may be an individual carrier such that the control signaling may be mapped to existing control signaling designs (e.g. from previous standard releases such as R10).

Various methods or bundling criteria may be used to pair or bundle M carriers to N carriers (e.g., to implement carrier pairing or bundling into N entities) in MC-HSDPA as shown in FIG. 2 and described herein. For example, M DL carriers may be bundled or paired by bundling or pairing DL carriers configured within a frequency band together and/or by bundling or pairing DL carriers with a MIMO configuration (e.g. MIMO enabled) together and bundling or pairing the remaining carriers without a MIMO configuration (e.g. MIMO disabled) together.

According to another embodiment, M DL carriers may be bundled or paired based on the number of Transport Blocks (TrBlks) that a UE such as the WTRUs 102a-d discussed above may support, the total number of serving/secondary serving HS-DSCH cells, and/or the total number of serving/secondary serving HS-DSCH cells that MIMO may be configured to use and may be defined by, for example, a UE.

Figure 3:
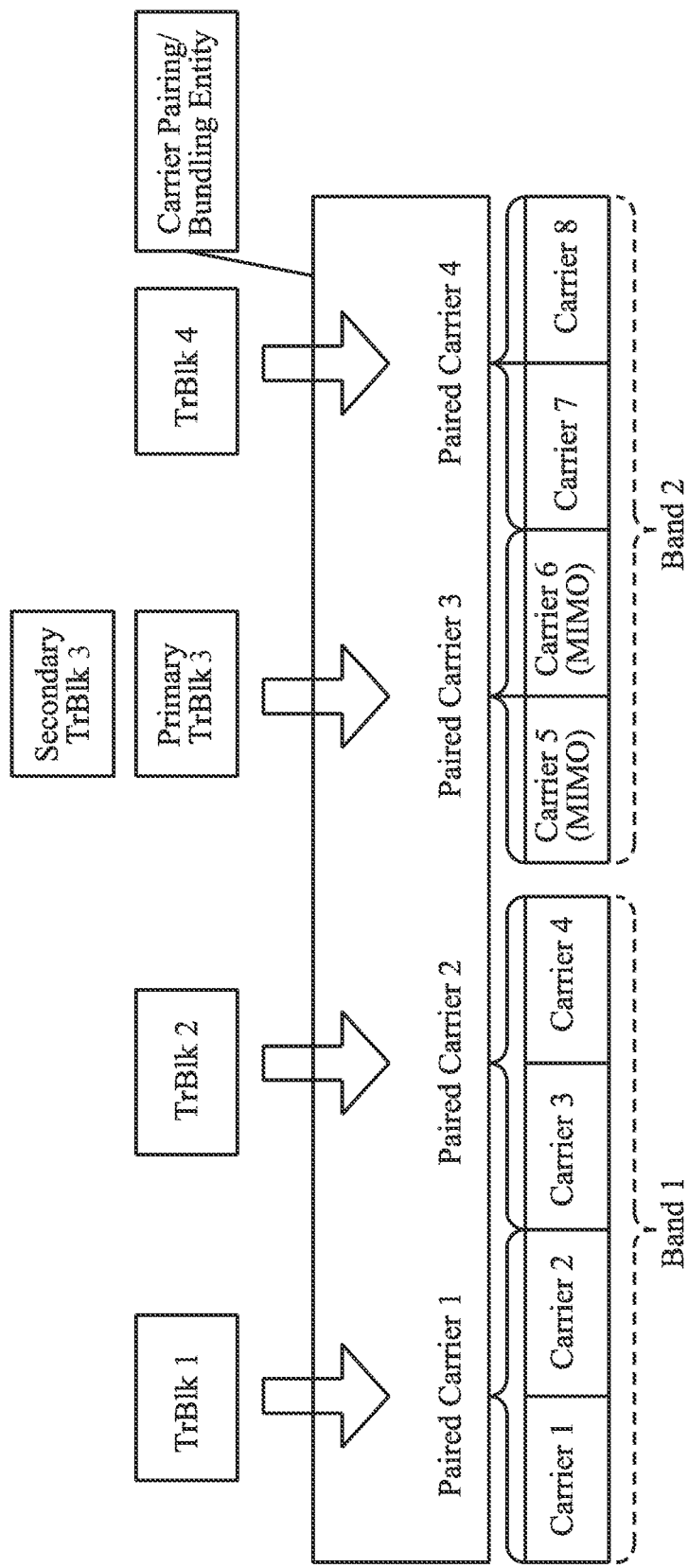
FIG. 3 illustrates a diagram of an example embodiment of 8C-HSDPA with paired carriers.

FIG. 3 illustrates a diagram of an example embodiment of 8C-HSDPA with downlink carriers bundled or paired with one or more methods disclosed herein. For example, a UE such as the WTRUs 102a-d may support up to 5 TrBlks and may be configured with 8 serving/secondary serving HS-DSCH cells, two of which may be configured with MIMO. As shown in FIG. 3, in one embodiment, every two carriers may be bundled and/or paired together For example, in one embodiment, each TrBlk in FIG. 3 may span paired carrier 1, 2 and 4 while two TrBlks may span the paired carrier 3 configured with MIMO.

Additionally, DL carriers may be bundled or paired based on or depending on the available HS-SCCH order bits for carrier activation/deactivation. For example, bundled or paired DL carriers may be activated/deactivated as a group (e.g. simultaneously) by one or more HS-SCCH orders (e.g., carrier activation/deactivation may be on per-group basis). As such, order types xodt,1, xodt,2, xodt,3='000' may be used for activation and deactivation of DTX, DRX and HS-SCCH-less operation and for HS-DSCH serving cell changes. According to an example embodiment, the available 6 bits including 3 bits of order type and 3 bits of order (xord,1, xord,2, xord,3) for a specified HS-SCCH order physical channel may be used to represent 56 resulting activation/deactivation states of secondary carriers. In a wireless communication system such as the communication system 100 that may implement MC-HSDPA with M being greater than 5 downlink carriers, the M carriers may be paired or bundled into N entities or groups of carriers where N is a non-zero integer less than 6 as $56 < 2^6$.

DL carriers may also be bundled or paired based on or depending on bits associated with the channel quality indictor (CQI) that may be used to schedule transmissions in the wireless communication system disclosed herein such communication system 100. In one embodiment, DL carriers may be bundled or paired based on the number of bits available for a channel quality indicator (CQI) field as described herein. For example, in one embodiment, if the total number for all DL carrier CQI reports may be T and each CQI corresponding to one bundled carrier entity may be t, then T divided by t (T/t) carriers may be bundled or paired into an entity (or a bundled carrier entity) based on the criteria described herein.

Figure 4:
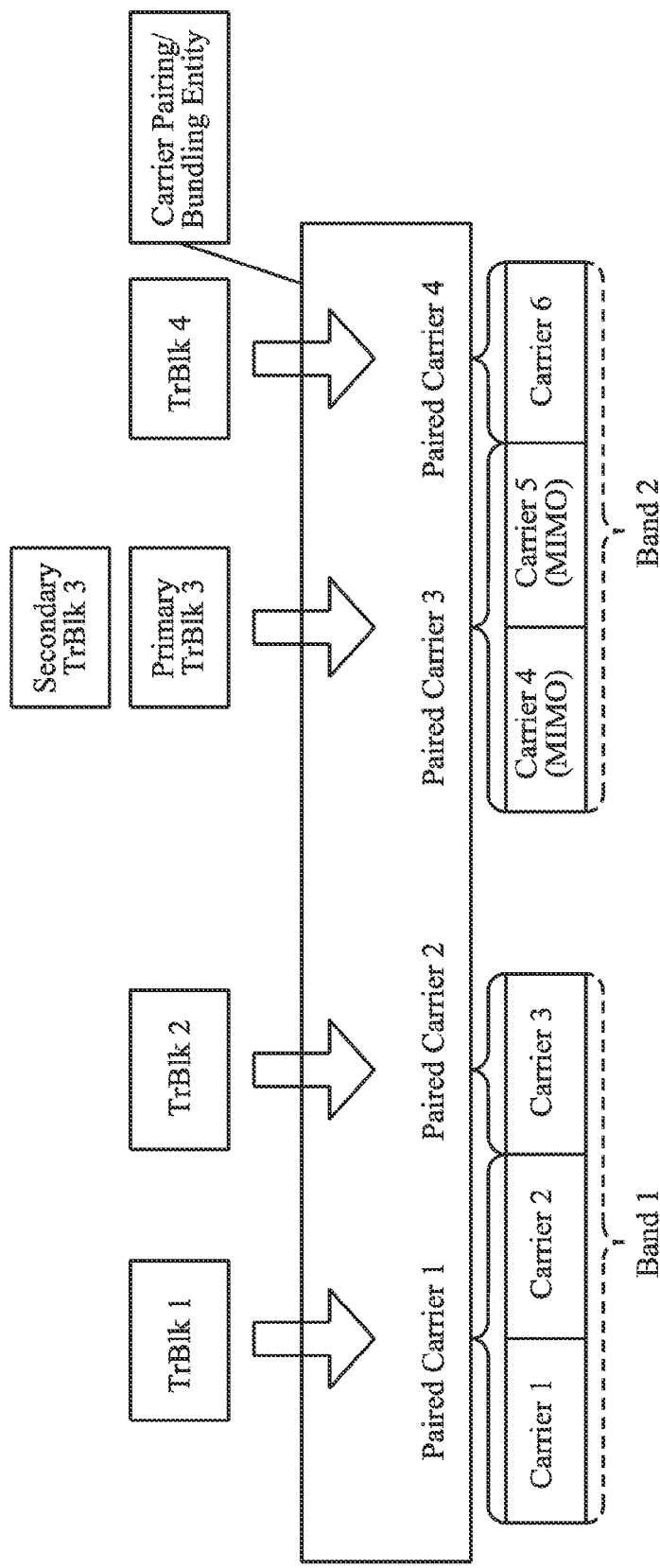
FIG. 4 illustrates a diagram of an example embodiment of 8C-HSDPA with paired and unpaired carriers.

According to another embodiment, DL carriers may be bundled or paired based on frequencies bands associated with the DL carriers. For example, two or more DL carriers that may be in adjacent frequencies or frequency bands may be bundled or paired together based on or depending on currently available HS-DPCCH formats and a total number of configured carriers. In particular, to reuse currently available 4C-HSDPA formats for 8C-HSDPA, each of the configured carriers (e.g. up to 8) may be paired every two adjacent carriers (e.g. frequency adjacent) in an ascending fashion, descending fashion, or by another other suitable method or order. For example, if eight DL carriers may be configured and indexed as 1, 2, 3, 4, 5, 6, 7 and 8, then they may be paired as (1, 2), (3, 4), (5, 6), (7, 8). Another example of 8C-HSDPA with paired and unpaired carriers is shown in FIG. 4. FIG. 4 illustrates a diagram of an example embodiment of 8C-HSDPA with paired and unpaired carriers. As shown in FIG. 4, 6 DL carriers which are indexed as 1, 2, 3, 4, 5 and 6 are configured and may be paired as (1, 2), (3), (4, 5), (6).

According to additional embodiments, certain types of DL carriers may be bundled and/or paired together into, for example, N entities or groups of carriers. For example, secondary DL carriers that may be used in MC-HSDPA may be bundled or paired using one or more of the methods described herein and the primary carrier may not be bundled or paired. Alternatively, DL carriers regardless of whether such DL carriers may be primary or secondary DL carriers may be paired or bundled together using one or more of the methods described herein.

In other embodiments, DL carriers may be bundled or paired into N entities or groups based on or depending on cells associated with the DL carriers. For example, multiple cells associated with the DL carriers may be configured in the same frequency band or a number of frequencies bands in multipoint transmission. As such, in one embodiment, DL cells such as secondary cells and/or primary cells in or associated with a particular frequency band or within a particular frequency band range may be bundled or pared together into N entities or groups. According to another embodiment, DL cells may be bundled or paired based on control information or control signaling associated with such DL cells. For example, DL cells associated with particular DL cell that may carry common DL control information or signaling such as HS-SCCH information or signaling may be bundled or paired together into one or more of the N entities or groups.

DL cells associated with a particular uplink (UL) carrier (e.g. a primary or secondary UL carrier) may also be bundled or paired into N entities or groups. For example, a group DL cells may receive feedback from a particular UL carrier (e.g. cell or channel). Such a group of DL cells may then be bundled or paired together into one of the N entities or groups. In particular, according to an embodiment, several UL feedback channels or resources may be deployed for multiple downlinks such that a wireless communication network may configure the UE to provide feedback on a particular UL carrier for a set of DL cells. Such a set of DL cells may belong to a cell group that may be bundled or paired into one of the N entities or groups. The cell group may also include some or all the cells that may be included in a pre-defined list of DL cells (e.g. explicit definitions of groups); DL cells in a particular frequency band; cells in DL adjacent carriers; DL cells in a particular frequency or in a particular group of frequencies; and/or DL cells in adjacent carriers associated with a particular UL carrier (e.g. a particular primary or secondary UL carrier).

Additionally, for HARQ ACK/NACK and/or CQI reporting, the DL cells may be grouped based on activation status of the configured cells. For example, in 8C-HSDPA, if 6 carriers may be activated, the 6 activated carriers may be bundled or paired into N entities or groups based on on one or more of the methods for bundling or pairing described herein. Thus, the pairing or bundling entity may apply to activated carriers instead of the configured carriers in MC-HSDPA. According to example embodiments, the pairing or bundling of the DL carriers or cells may be kept the same regardless of a subsequent activation status change of one or more of the DL carriers or cells. Alternatively, the pairing or bundling of the DL carriers or cells may be changed based on a subsequent activation status of the cells using one or more of the bundling or pairing methods disclosed herein. For example, if a carrier changes from activated to deactivated, that carrier may no longer be bundled or paired. Alternatively, if a carrier changes from deactivated to activated, that carrier may be paired or bundled with other activated carriers using one or more of the methods for paring or bundling described herein.

DL carriers or cells may further be bundled or paired into N entities or groups based on one or more messages received or generated by a wireless network such as a RCC configuration message. For example, a RRC configuration message may indicate which particular DL carriers or cells may be bundled or paired together. Alternatively, the RRC configuration may include an order of DL carriers or cells such that the DL carriers in each pairing or bundling may be chosen based on the order in which they appear in the RRC configuration message. Additionally, the RRC configuration message may provide a pre-defined or signaled value (e.g. K) that may be less than or equal to the number of DL carriers (e.g. M DL carriers) in HSDPA such that the DL carriers may be grouped into K entities or groups using one or more of the bundling or pairing methods disclosed herein. Serving cells may also be numbered in an order that their configuration IEs appear in the RRC configuration message or may be pre-defined such that the serving cells may be bundled or paired based on such an order.

The bundling or pairing methods disclosed herein for DL carriers may also be used for bundling or pairing feedback information associated with one or more DL carriers (e.g., HARQ ACK/NACK and/or CQI, CQI/PCI if MIMO may be configured) on one UL HS-DPCCH channel even if such DL carriers may not be physically bundled or paired.

According to an example embodiment, if a carrier or cell that may be bundled or paired (e.g. as described herein) may be configured with MIMO, then one or two HS-DSCH TrBlks (e.g., a primary HS-DSCH TrBlk and a secondary HS-DSCH TrBlk) may span over the paired or bundled DL carrier. Alternatively, if a carrier or cell that may be bundled or paired may not be not configured with MIMO, then one HS-DSCH TrBlk may span the paired or bundled carrier. According to an example embodiment, a data splitter may be used to span the bundled or paired carrier over one HS-DSCH TrBlk.

Figure 5:
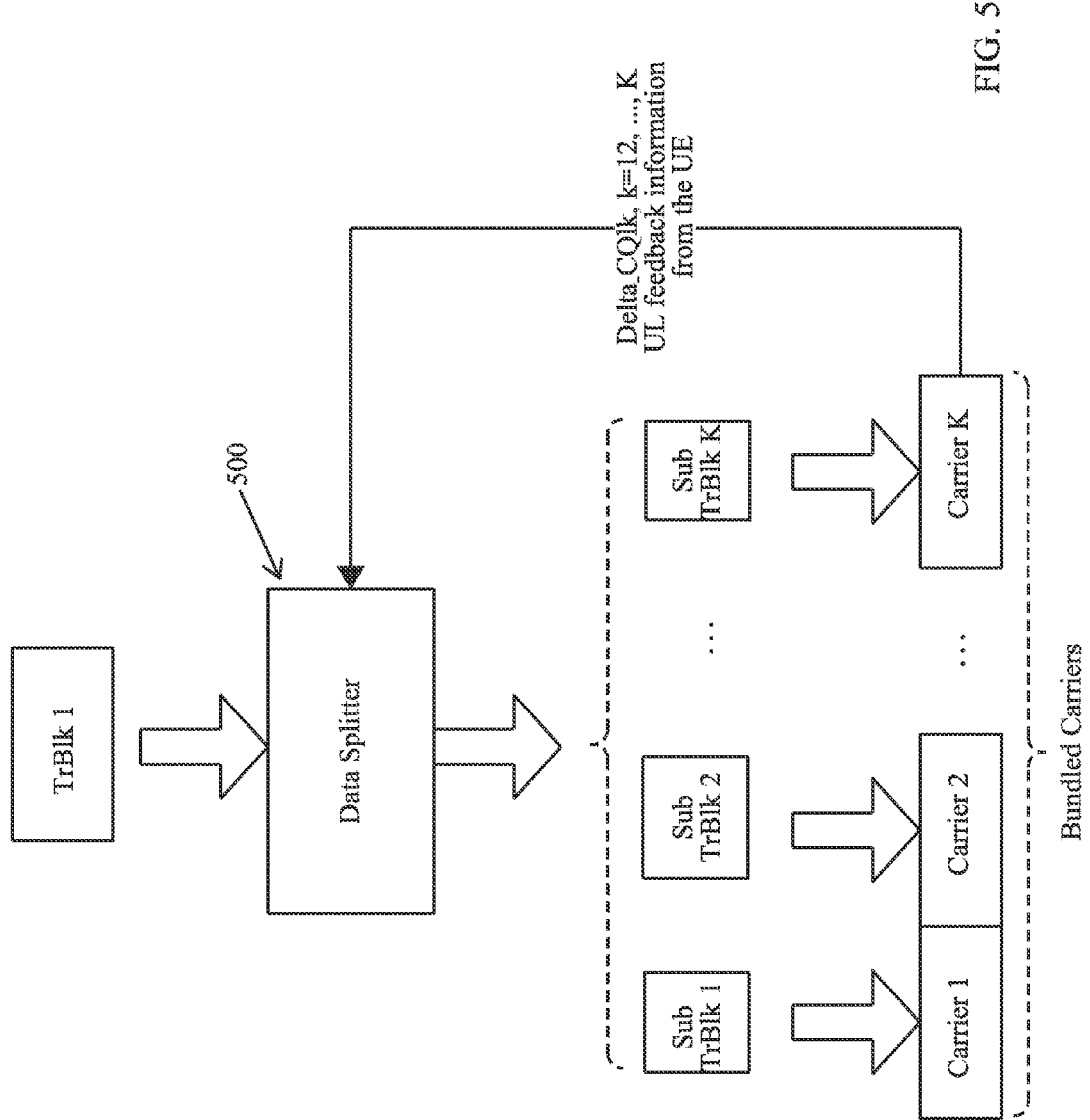
FIG. 5 illustrates a diagram of an example embodiment of a data splitter for a bundled carrier.

FIG. 5 illustrates an example embodiment of a data splitter 500 that may be used to span a bundled or paired carrier over one HS-DSCH TrBlk. As shown in FIG. 5, the data splitter 500 may split data using one or more methods or techniques disclosed herein to enable the bundled or paired carrier to span one HS-DSCH TrBlk. According to one embodiment, the data splitter 500 shown in FIG. 5 may split such data before or after CRC attachment and/or channel coding depending on, for example, the number of HARQ-ACK allowed to detect/report at the UE receiver, the number of TrCH processing chain at the NodeB transmitter, and the like.

In one embodiment, the data may be split (e.g. by the data splitter 500 shown in FIG. 5) by dividing a TrBlk equally among a bundled or paired carrier. For example, if the total number of carriers bundled together may be K, then the size of sub-TrBlk after data splitting equally using one TrBlk may be TBS/K when, for example, the original size of the HS-DSCH TrBlk may be TBS. By dividing a TrBlk equally among a bundled or paired carrier, channel quality of each individual carrier with a bundled or paired carrier may not be signaled (e.g. at the cost of scheduling gain).

The data may also be split (e.g. by the data splitter 500 shown in FIG. 5) by dividing a TrBlk based on UL feedback information generated by one or more components of the wireless communication network. For example, one TrBlk may be divided or split into K sub-TrBlks based on K CQIs corresponding to K carriers of a bundled or paired carrier. To reduce UL feedback that may be caused by the total CQIs for the bundled carrier, delta_CQIs for each bundled or paired carrier may be fed back to the eNB or NodeB from a UE. The delta_CQI that may be fed back may be presented by less bits than a typical or regular CQI value. As described above, the data splitter shown in FIG. 5 may data split a paired carrier based on K delta_CQI values feedback from the UE.

Additionally, a TrBlk may be divided or split into K sub-TrBlks that may be carried on K carriers in a bundled carrier (e.g. two or more carriers being bundled together). When K=2, a data splitter may be a data splitter for a paired carrier (e.g. a two carriers bundled together).

Figure 6:
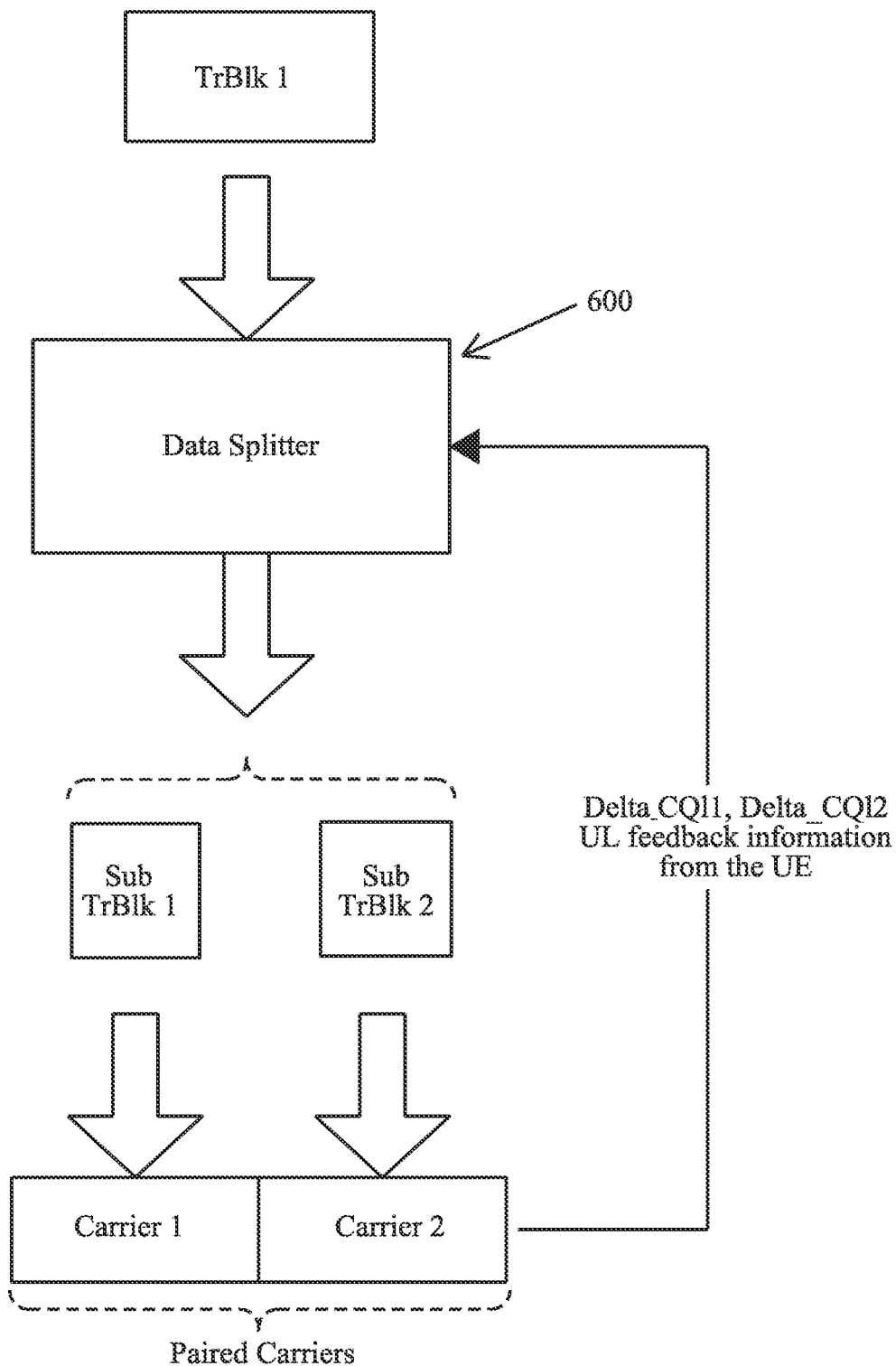
FIG. 6 illustrates a diagram of an example embodiment of a data splitter for a paired carrier.

FIG. 6 depicts another example embodiment of a diagram for a data splitter 600 for a bundled carrier or a paired carrier (e.g. a bundled carrier that may include two carriers bundled or paired together). According to one embodiment, the data splitter 600, for example, shown in FIG. 6 may divide one TrBlk into K sub-TrBlks for K carriers in a bundled carrier or paired carrier (e.g. when K=2) using a ration provided and/or signaled from a UE or other component of the wireless communication system to a eNB or NodeB rather than providing or signaling one or more delta_CQIs. Such a ratio provided or signaled from, for example, a UE may further reduce UL feedback signaling overhead.

Additionally, two HS-DSCH TrBlks (e.g. primary and secondary HS-DSCH TrBlks) may span a bundled or paired carrier (e.g. with or without a MIMO configuration) may be split or divided by any of the data splitting methods described above. According to an example embodiment, the data splitting ratio may or may not be the same for the two HS-DSCH TrBlks (e.g. the primary and secondary HS-DSCH TrBlks). Additionally, the number of HARQ processes related to two HS-DSCH TrBlks and a bundled or paired carrier associated therewith may be 2 or 1 depending on, for example, whether or not a UE may be configured in a MIMO mode in one or more cells in the bundle.

In another embodiment, multiple transport blocks (TrBlk) may be carried by one or more serving cells in a carrier bundle or pair. For example, the number of serving cells in a bundle or pair may be denoted as N. As such, K transport blocks may be transmitted via the bundle or pair where K may be an integer of range 1<K≤N. According to an example embodiment, each cell may carry one TrBlk such that data associated therewith may not be split or divided (e.g. when K=N).

The size of each Trblk may be individually determined by, for example, cell-specific CQI reports for each serving cell in a bundle or pair. The cell-specific CQI reports may be sent, via an uplink, using for example Time-Division Multiplexing (TDM) or any other suitable method or technique including using a 'delta' CQI as described herein. Alternatively, the transport block size for one or more serving cells in a bundle or pair may be determined or set to an amount that may be included in a CQI report associated with a bundle or pair (e.g. bundle-specific CQI reports).

Each transport block may have a cyclic redundancy check (CRC) associated therewith. As such, a HARQ operation may be applied on each individual transport block. When applying such a HARQ operation, the number of HARQ processes called for may be determined by the number of transport blocks in the bundle, rather than the number of serving cells. Alternatively, joint HARQ processes may be designed for a multiple transport block sent by cells in a bundle or pair such that grouped ACK/NACK reporting in uplink control information feedback may be used.

The bundling or pairing methods or techniques described herein may be performed when a UE may be initially configured with multiple carriers by higher layer such as at a RRC configuration. In such an embodiment, configured secondary severing cells may be dynamically activated or deactivated via L1 signaling. Additionally, as less cells may be involved in a data transmission, the UE behavior may be specified when the activation or deactivation may occur.

In one embodiment, serving cells or carriers may be regrouped into different bundling/pairing relations using one or more rules (e.g. predefined rules) such that the number bundling/pairing entities may be less thereby reducing signaling. The rules may include one or more of the following: cells in the same frequency band may be regrouped under a criterion that cells in the same bundle or pair may be within the adjacent frequencies as much as possible; cells associated with the same uplink frequencies may be regrouped under a criterion that cells in the same bundling or pair may be within the adjacent frequencies as much as possible; and cells may be regrouped sequentially based on a sorted order.

For example, serving cells or carriers may be labeled by consecutive numbers at a carrier configuration via high layer signaling using a RRC configuration. When a deactivation order may be received with one or more cells deactivated, the cells may be sorted according to the carrier labels and may be regrouped sequentially according to the sorted order. For example, when 8 carriers may be configured with pairing rules {1,2} {3,4} {5,6} {7,8}, the cells may be regrouped with a new pairing relation {13} {67} if, for example, cells 2 4 5 8 may be deactivated.

In another embodiment, the bundling/pairing relations between or carriers ay be unchanged upon deactivation of serving cells or carriers. Additionally, when one or more cells or carriers in a bundle or pair may be deactivated, the remaining cells (e.g. the remaining activated cells) or carriers in the bundle or pair may carry a TrBlk of smaller size. As the number of remaining cells (e.g. activated cells) or carriers may be reduced, the amount of control information to support such remaining cells may also be reduced. As such, a power offset on the UL and/or DL control channels may also be less or reduced.

The rules of an activation/deactivation may also be designed in such way that the HS-SCCH order may be executed to activate/deactivate a bundle or pair. In such an embodiment, control signaling for the UL and/or DL may reuse current HS-SCCH order and channels and may operate as if there may be a smaller number of activated serving cells.

According to one embodiment, a UE may receive or acquire information (e.g. configuration information) associated with or that may include which carriers may be bundled or paired. For example, the information may be transmitted by a component of a wireless communication system such as NodeB or eNB, for example, to a UE explicitly or implicit to signal the bundling or pairing of a downlink carrier. The UE may receive or acquire configuration information regarding which carriers may be bundled or paired and, thus, controlled by one HS-SCCH such that the UE may decode the bundled or paired carriers (e.g. in the N entities) using the configuration information. The configuration information that may include bundling or pairing information may be pre-defined based on the number of configured carriers or based on carriers configured by higher layer.

The configuration information or information indicating bundled or paired carriers may be signaled, for example, explicitly to a UE. In one embodiment, a new IE may be introduced on a RRC control signaling message to explicitly signal the configuration. For example, a RNC may send the RRC control signaling message to a UE. The UE may then extract the configuration information of bundled or paired carriers from the RRC message.

In another embodiment, a L2 message, via, for example, a MAC header, may be used to explicitly signal the configuration information of a bundled or paired carrier. For example, after receiving such a L2 signal or message (e.g. a semi-static message), a UE may decode a HS-SCCH and extract the control information used for data demodulation across multiple carriers as described herein.

Alternatively, a L1 message may be used to explicitly signal the configuration of a bundled or paired carrier, for example, using a HS-SCCH order such as a HS-SCCH order proposed herein and described in more detail below.

The configuration or information indicating bundled or paired carriers may also be signaled, for example, implicitly to a UE. In one embodiment, instead of introducing a new parameter or signaling message, the configuration or pre-defined configuration information of a bundle or paired carrier may be signaled by an existing parameter (e.g. a Secondary_Cell_Enabled or Secondary_Cell_Activ). An example may be shown in Table 1 where a Secondary_Cell_Enabled may be equal to the number of the secondary serving HS-DSCH cells configured by higher layers based on the Secondary_Cell_Enabled. The UE may implicitly signal the bundled or paired DL carriers and may maps them to the equivalent configuration in 4C-HSDPA using for, example, the parameters shown in Table 1.

TABLE 1

Carrier configuration based implicit signaling

| Secondary_Cell_Enabled | Bundling/pairing of DL carriers | Equivalent configuration in R10 4C-HSDPA |
|---|---|---|
| 0 <= Secondary_Cell_Enabled <= 3 | No pairing | Configure (Secondary_Cell_Enabled + 1) DL carriers |
| 4 | (0, 1), (2, 3), (4) | Configure 3 DL carriers |
| 5 | (0, 1), (2, 3), (4, 5) | Configure 3 DL carriers |
| 6 | (0, 1), (2, 3), (4, 5), (6) | Configure 4 DL carriers |
| 7 | (0, 1), (2, 3), (4, 5), (6, 7) | Configure 4 DL carriers |

According to an example embodiment, the methods described herein (e.g. to implicitly or explicitly signal configuration information or information associated with a bundled or paired carrier) may be used when, for example, DL carriers that may be bundled or paired may use one HSDPA TrBlk, or UL carriers with feedback contents (e.g., HARQ ACK/NACK, CQI, CQI/PCI if MIMO configured, and the like) may be bundled or paired. When such bundled or paired DL carriers use one HSDPA TrBlk or bundled or paired UL carriers include such feedback contents, current HS-DPCCH formats may be used to support the additional carriers that may be included in MC-HSDPA. For example, when such bundled or paired DL carriers use one HSDPA TrBlk or bundled or paired UL carriers include such feedback contents, current HS-DPCCH formats used in 4C-HSDPA may be used to support the additional carriers associated with 8C-HSDPA.

In an MC-HSDPA system with bundled or paired carriers, the UE may also use DL control information for an associated HS-PDSCH data demodulation. To reduce DL control signaling overhead, one HS-SCCH associated with HS-PDSCHs carried on a bundled or paired carrier may be sent on one or more of the following: one of the carriers included in the bundled or paired carrier, a first carrier included in the bundled or paired carrier, a carrier with the least amount of load included in the bundled or paired carrier, and a primary carrier if the primary carrier belongs to the bundled or paired carrier. For example, if a bundled carrier includes K carriers, one HS-SCCH associated with HS-PDSCHs carried on the bundled carrier may be sent on one or more of the following: one of the K carriers; a first carrier of the K carriers; a carrier with less load (e.g. smaller sub-TrBlk) than others the other carriers included in the K carriers; and a primary carrier if the primary carrier belongs to the K carriers.

After a UE may receive a HS-SCCH carried on one of the carriers included in a bundled or paired carrier (e.g. one of the K carriers), the UE may apply the control information received on HS-SCCH to the data demodulation on the appropriate K carriers.

To facilitate data demodulation across K carriers, one HS-SCCH may be designed, implemented, and used as disclosed herein. In one embodiment, an existing HS-SCCH may be signaled and used for K sub-TrBlks carried on a bundled carrier or 2 sub-TrBlks carried on a paired carrier. The value of 6 bits Transport-block size (TBS) information $X_{tbs}=(x_{tbs,1}, x_{tbs,2}, \ldots, x_{tbs,6})$ may represent the size of one TrBlk spanning the bundled or paired carrier or the size of one sub-TrBlk carried ($X_{sub\_tbs}$) on each individual carrier of the bundled or paired carrier. The ratio between these two values may be 1/K. According to one embodiment, an existing HS-SCCH may be signaled as described above when one HS-DSCH TrBlk may be equally split into K sub-TrBlks corresponding to K carriers of a bundled carrier (or one HS-DSCH TrBlk may be evenly split into 2 Sub-TrBlks for a paired carrier) such that the same channel coding, modulation and HARQ may be applied to the evenly split sub-TrBlks due to a same or similar channel condition.

According to another embodiment, a joint HS-SCCH format may be provided. The joint HS-SCCH may be designed or implemented based on a tradeoff of scheduling flexibility and reducing signaling overhead. The joint HS-SCCH may be used to carry common and carrier-specific control information for one TrBlk spanned across K carriers that may include a common part and a carrier-specific part. The common part may include the common control information that may be shared for one or more sub-TrBlks across K carriers while the carrier-specific part may individually include the carrier-specific control information for K carriers that may be used for data demodulation. Also, the Joint HS-SCCHs may be designed based on the tradeoff of scheduling flexibility and signaling overhead reduction.

One or more parameters may be included in the common part or the carrier-specific part that may be transmitted by the joint HS-SCCH physical channel (e.g. for K carriers configured in non-MIMO or MIMO mode). The parameters may include channelization-code-set information; modulation scheme information; hybrid-ARQ process information; a redundancy and constellation version; a data indicator; a UE identity; transport-block size information; precoding weight information (e.g. if one transport block may be configured for MIMO mode); a number of transport blocks information (e.g. if one transport block may be configured for MIMO mode); precoding weight information for a primary transport block (e.g. if two transport blocks may be configured for MIMO mode); transport-block size information for the primary transport block (e.g. if two transport blocks may be configured for MIMO mode); transport-block size information for a secondary transport block (e.g. if two transport blocks may be configured for MIMO mode); a redundancy and constellation version for a primary transport block (e.g. if two transport blocks are configured for MIMO mode); a redundancy and constellation version for the secondary transport block (e.g. if two transport blocks may be configured for MIMO mode)

According to an example embodiment, a parameter that may be included in the common part may not be included a UE-specific part, and vice versa. Additionally, when a selecting one or more parameters for a common part and UE-specific part of a joint HS-SCCH, the common part may include common control information that may be shared by, for example, carriers (e.g. K carriers) such that the least carrier-specific control information may be included in individual carrier-specific parts. Also, the common part may include limited common control information that may be shared for carriers (e.g. K carriers) such that more carrier-specific control information may be included in each carrier-specific part.

One or more coding chain schemes may also be used for transmissions on the joint HS-SCCH. For example, channelization codes and modulation schemes may be used across carriers (e.g. K carriers) in, for example, a bundled or paired carrier.

Figure 7:
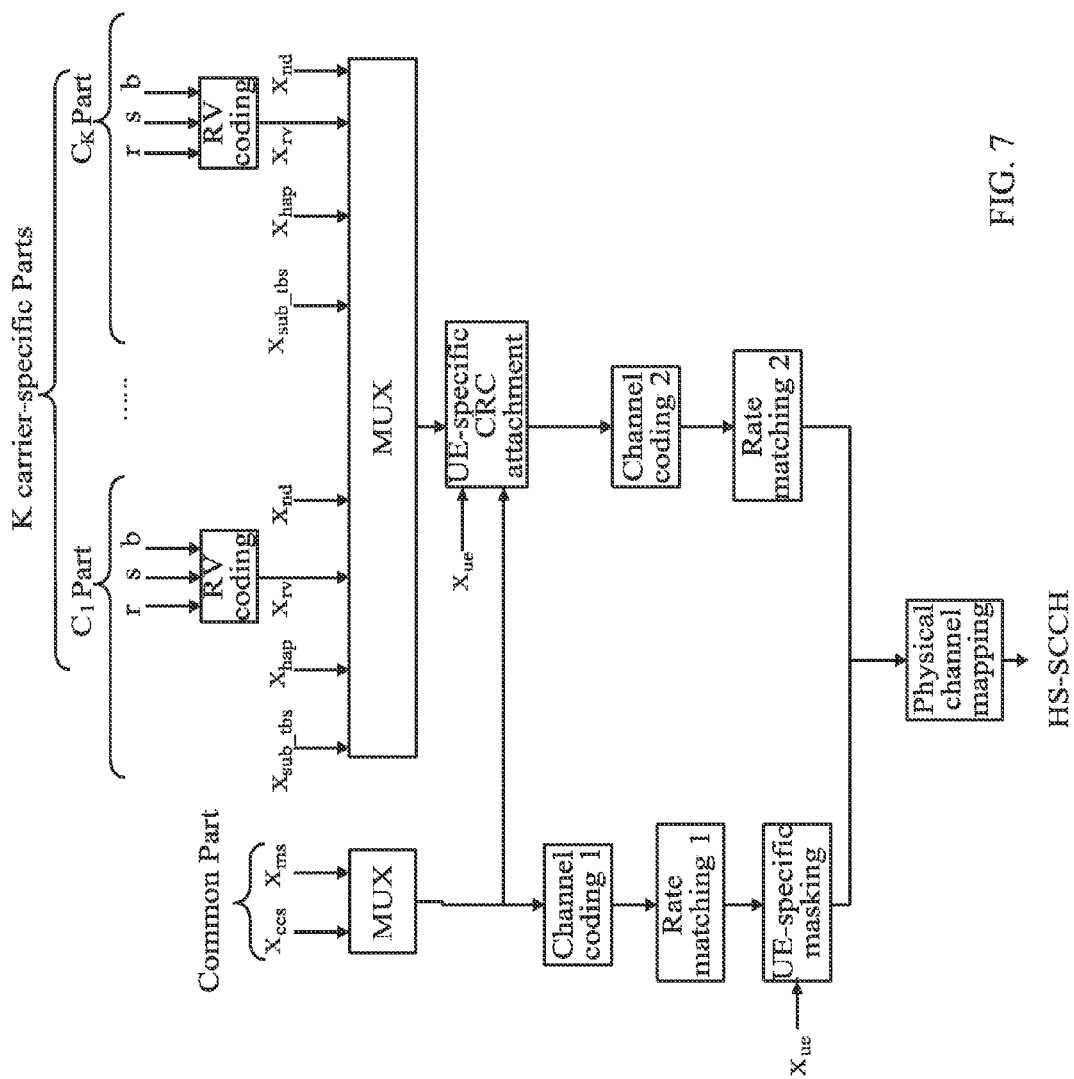
FIG. 7 illustrates a diagram of an example embodiment of a coding chain scheme for joint HS-SCCH of a bundled carrier configured for a non-MIMO mode.
Figure 8:
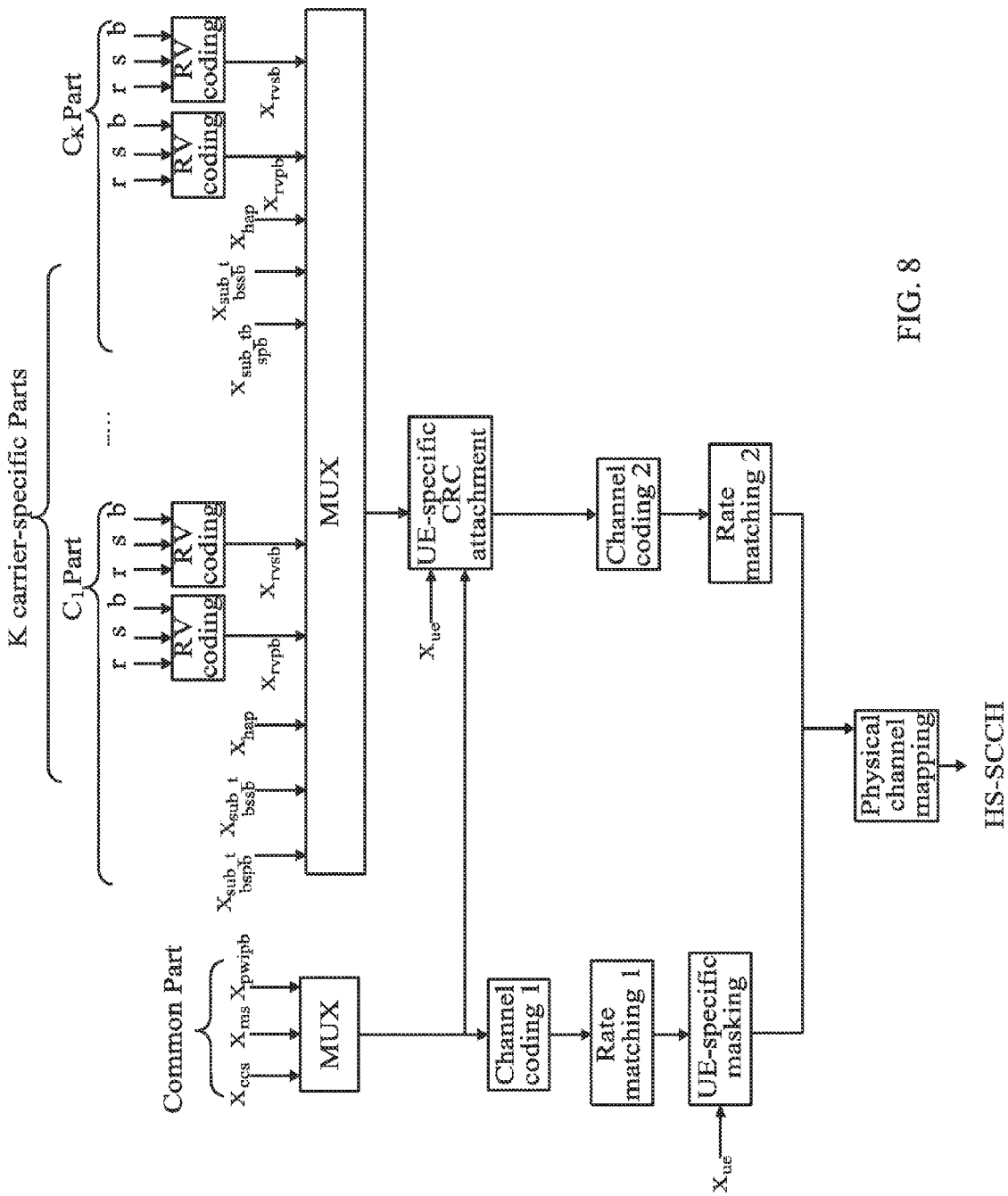
FIG. 8 illustrates a diagram of a coding chain scheme of joint HS-SCCH for a bundled carrier configured MIMO mode according to an embodiment.

FIG. 7 and FIG. 8 illustrate diagrams of coding schemes that may be used in a joint HS-SCCH for a bundled or paired carrier not configured with MIMO and configured with MIMO, respectively. As shown in FIGS. 7 and 8, a number of channelization codes (e.g. used for a TrBlk) and modulation schemes may be common across K carriers associated with a bundled or paired carrier not configured with MIMO and configured with MIMO. The channelization codes used for a particular TrBlk may also be different across K carriers associated with a bundled or paired carrier not configured with MIMO and configured with MIMO.

According to another embodiment, to facilitate data demodulation for a UE across or over a bundled or paired carrier, one or more new parameters may be introduced to indicate a difference in HS-DSCH data transmitted over carriers (e.g. K carriers). For example, a scaling factor denoted as $R_{tbs,k}$ may be introduced. The scaling factor $R_{tbs,k}$ may be the size of a sub-TrBlk transmitted on the $k^{th}$ carriers. For example, the scaling factor $R_{tbs,k}$ may be represented by less than the 6 bits of Transport block size (TBS) information (e.g. 6 bits: $x_{tbspb,1}, x_{tbspb,2}, \ldots, x_{tbspb,6}$) thereby reducing the load associated with the using a DL HS-SCCH. In one embodiment, the size of one TrBlk across carriers (e.g. K carriers) or $X_{tbs}$ may be included in the common part while the scaling factor for each carrier, $R_{tbs,k}$ may be included in the K carrier-specific parts rather than individually signaling the size of sub_TrBlk ($X_{sub\_tbs,k}$).

A HS-SCCH order for activation/deactivation for one or more secondary carriers in MC-HSDPA (e.g. 4C-HSDPA, 8C-HSDPA, and the like) may be a single HS-SCCH order that may simultaneously activate/deactivate configured carriers on per-carrier basis. For example, if a 6-bit HS-SCCH order may be used, then the total states that may be be represented may be 64 (or $2^6$) taking into account a 8 HS-SCCH order used for other purposes such as activation and deactivation of DTX, DRX and HS-SCCH-less operation and for HS-DSCH serving cell change. As such, the available 6bit HS-SCCH orders for carrier activation/deactivation may be 56 (e.g. due to $2^5<56<2^6$), if the number of bundled or paired carriers may be less than 6 such that a single HS-SCCH order may simultaneously activate/deactivate configured and bundled or paired carriers on per-group basis by reusing any per-carrier based method by, for example, replacing each carrier with one-group bundled or paired carriers.

According to an example embodiment, a single HS-SCCH order may simultaneously activate/deactivate configured and bundled or paired carriers on a per-group basis using one or more rules. The one or more rules may include activating/deactivating configured and bundled or paired carriers on a per-group basis such that that a 1st secondary serving HS-DSCH cell may not be bundled with other secondary serving HS-DSCH cells (e.g. the 1st secondary serving HS-DSCH cell may be bundled with itself or treated as one group) due to the association between 1st secondary serving HS-DSCH cell and the secondary uplink frequency when DC-HSUPA may be configured. As such, the 1st Secondary Serving HS-DSCH cell may not be deactivated due to the deactivation of another bundled secondary serving HS-DSCH cell when the secondary uplink frequency may still be activated.

The one or more rules may further include activating/deactivating configured and bundled or paired carriers on a per-group basis such that a primary DL carrier (or serving HS-DSCH cell) may not be bundled with other carriers (or secondary serving HS-DSCH cells) if the primary carrier may not be deactivated. If the primary DL carrier (or serving HS-DSCH cell) may be bundled or paired with other DL carriers (or secondary serving HS-DSCH cells), the HS-SCCH order used to activate/deactivate the bundled or paired carrier may be conditioned to activate/deactivate other DL carriers rather than the primary DL carrier (e.g. secondary serving HS-DSCH cells) in the bundled or paired carrier.

The one or more rules may further include activating/deactivating configured and bundled or paired carriers on a per-group basis such that a 1st secondary serving HS-DSCH cell may be bundled with a secondary uplink frequency and activated/deactivated as a group that may use one bit (e.g. bundling or pairing information) thereby reducing the bit consumption on a HS-SCCH order. Such bundling or pairing information (e.g. the one bit) may be signaled using a higher layer message (e.g. a RRC message).

According to an example embodiment, the carrier activation/deactivation on per-carrier basis including the one or more rules associated therewith may be reused for carrier activation/deactivation on per-group basis when an individual carrier may be replaced by a group of carrier in MC-HSDPA with a bundled or paired carrier. As a 6-bit HS-SCCH order may support simultaneous carrier activation/deactivation for up to 5 groups on per-group basis, the secondary serving HS-DSCH cells and secondary uplink Frequency may be bundled or paired up to 5 groups of carrier to be activated/deactivated.

For example, in 8C-HSDPA, to use a single HS-SCCH order to simultaneously activate/deactivate 7 secondary serving HS-DSCH cells and a secondary uplink frequency if DC-HSUPA may be configured, 8 serving/secondary serving HS-DSCH cells may be paired as (0), (1), (2,3), (4,5) and (6,7), then 4 paired/unpaired secondary serving HS-DSCH cells and secondary uplink Frequency may be simultaneously activated/deactivated by a single HS-SCCH order as shown in Table 2 below where (0) may indicate the serving HS-DSCH cell may not e bundled or paired with other secondary serving HS-DSCH cells. According to other example embodiments, the actual command-to-bit mapping and pairing of secondary carriers shown in Table 2 may be different in actual implementation. For example, 8 serving and secondary serving HS-DSCH cells may be paired as (0), (1), (2),(3) and (4,5,6, 7), then 4 paired/unpaired secondary serving HS-DSCH cells and a secondary uplink Frequency may be simultaneously activated/deactivated by a single 6-bit HS-SCCH order.

TABLE 2

Orders for activation and deactivation of Secondary carriers in 8C-HSDPA with 5 paired/unpaired DL carriers (or 4 paired/unpaired DL secondary serving HS-DSCH cells)

| Order Type (xodt, 1, xodt, 2, xodt, 3) | Order Mapping | | | Activation Status of Secondary Serving HS-DSCH cells and Secondary Uplink Frequency | | | | |
|---|---|---|---|---|---|---|---|---|
| | $x_{ord,1}$ | $x_{ord,2}$ | $x_{ord,3}$ | (1$^{st}$) Secondary Serving HS-DSCH cell | (2$^{nd}$, 3$^{rd}$) Secondary Serving HS-DSCH cells | (4$^{th}$, 5$^{th}$) Secondary Serving HS-DSCH cells | (6$^{th}$, 7$^{th}$) Secondary Uplink Frequency | Secondary Serving HS-DSCH cells |
| 001 | 0 | 0 | 0 | D | D | D | D | D |
|  | 0 | 0 | 1 | A | D | D | D | D |
|  | 0 | 1 | 1 | A | D | D | A | D |
|  | 0 | 1 | 0 | D | A | D | D | D |
|  | 1 | 0 | 0 | A | A | D | D | D |
|  | 1 | 0 | 1 | A | A | D | A | D |
|  | 1 | 1 | 0 | D | D | A | D | D |
|  | 1 | 1 | 1 | A | D | A | D | D |
| 010 | 0 | 0 | 0 | A | D | A | A | D |
|  | 0 | 0 | 1 | D | A | A | D | D |
|  | 0 | 1 | 0 | A | A | A | D | D |
|  | 0 | 1 | 1 | A | A | A | A | D |
|  | 1 | 0 | 0 | D | D | D | D | A |
|  | 1 | 0 | 1 | A | D | D | D | A |
|  | 1 | 1 | 0 | A | D | D | A | A |
|  | 1 | 1 | 1 | D | A | D | D | A |
| 011 | 0 | 0 | 0 | A | A | D | D | A |
|  | 0 | 0 | 1 | A | A | D | A | A |
|  | 0 | 1 | 0 | D | D | A | D | A |
|  | 0 | 1 | 1 | A | D | A | D | A |
|  | 1 | 0 | 0 | A | D | A | A | A |
|  | 1 | 0 | 1 | D | A | A | D | A |
|  | 1 | 1 | 0 | A | A | A | D | A |
|  | 1 | 1 | 1 | A | A | A | A | A |

A = Activate; D = De-activate

If the total number of bundled (or paired) carriers in MC-HSDPA (e.g. N bundled or paired carriers) may be less than a threshold (e.g. 5 or the current total order bits), then a single HS-SCCH order including a 3 bit order type ($x_{odt,1}$, $x_{odt,2}$, $x_{odt,3}$) and 3 bit order ($x_{ord,1}$, $x_{ord,2}$, $x_{ord,3}$) may simultaneously activate/deactivate carriers in MC-HSDPA (e.g. N bundled or paired carriers). According to an example embodiment, a HS-SCCH order mapping table may be introduced to define orders for activation/deactivation of bundled or paired carriers in MC-HSDPA (e.g. N bundled or paired carriers). Alternatively, orders for activation/deactivation of secondary carriers in 4C-HSDPA may be reused in MC-HSDPA by mapping each group of bundled (or paired) carriers in MC-HSDPA to each individual carrier in 4C-HSDPA. For example, in 8C-HSDPA, 7 secondary serving HS-DSCH cells may be bundled to three groups that may respectively replace $1^{st}$ $2^{nd}$ and $3^{rd}$ secondary serving HS-DSCH cells in a 4C-HSDPA order mapping table. An example implementation of 8C-HSDPA configured with DC-HSUPA may be shown in Table 3 where a 1st secondary serving HS-DSCH cell may not be bundled with other secondary serving HS-DSCH cells that may be associated with a secondary uplink frequency. In 8C-HSDPA configured with a single uplink carrier, the restriction of not bundling a 1st secondary serving HS-DSCH cell with other secondary serving HS-DSCH cells may not be used and DL secondary carriers may be bundled/paired into 4 bundled/paired secondary serving HS-DSCH cells that may be mapped to 4 individual carriers in 4C-HSDPA as shown in Table 4 below.

TABLE 3

Example Orders for activation and deactivation of in 8C-HSDPA + DC-HSUPA with N = 4 bundled DL carriers (or 3 bundled DL secondary carriers)

| Order Type $x_{odt,1}, x_{odt,2}, x_{odt,3}$ | Order Mapping $x_{ord,1}$ $x_{ord,2}$ $x_{ord,3}$ | Activation Status of Secondary Serving HS-DSCH cells and Secondary Uplink Frequency | | | |
|---|---|---|---|---|---|
| | | $1^{st}$ Secondary Serving HS-DSCH cell | ($2^{nd}$, $3^{rd}$) Secondary Serving HS-DSCH cell | ($4^{th}$, $5^{th}$, $6^{th}$, $7^{th}$) Secondary Serving HS-DSCH cell | Secondary Uplink Frequency |
| 001 | 0 0 0 | D | D | D | D |
| | 0 0 1 | A | D | D | D |
| | 0 1 1 | A | D | D | A |
| | 0 1 0 | D | A | D | D |
| | 1 0 0 | A | A | D | D |
| | 1 0 1 | A | A | D | A |
| | 1 1 0 | D | D | A | D |
| | 1 1 1 | A | D | A | D |
| 010 | 0 0 0 | A | D | A | A |
| | 0 0 1 | D | A | A | D |
| | 0 1 0 | A | A | A | D |
| | 0 1 1 | A | A | A | A |
| | 1 0 0 | Unused (Reserved) | | | |
| | 1 0 1 | Unused (Reserved) | | | |
| | 1 1 0 | Unused (Reserved) | | | |
| | 1 1 1 | Unused (Reserved) | | | |

A = Activate; D = De-activate

TABLE 4

Example Orders for activation and deactivation of 4 bundled/paired Secondary carriers in MC-HSDPA

| Order Type $x_{odt,1}, x_{odt,2}, x_{odt,3}$ | Order Mapping $x_{ord,1}$ $x_{ord,2}$ $x_{ord,3}$ | Activation Status of Secondary carriers | | | |
|---|---|---|---|---|---|
| | | $1^{st}$ bundled/paired Secondary Serving HS-DSCH cell | $2^{nd}$ bundled/paired Secondary Serving HS-DSCH cell | $3^{rd}$ bundled/paired Secondary Serving HS-DSCH cell | $4^{th}$ bundled/paired Secondary Serving HS-DSCH cell |
| 001 | 0 0 0 | D | D | D | D |
| | 0 0 1 | A | D | D | D |
| | 0 1 1 | A | D | D | A |
| | 0 1 0 | D | A | D | D |
| | 1 0 0 | A | A | D | D |
| | 1 0 1 | A | A | D | A |
| | 1 1 0 | D | D | A | D |
| | 1 1 1 | A | D | A | D |
| 010 | 0 0 0 | A | D | A | A |
| | 0 0 1 | D | A | A | D |
| | 0 1 0 | A | A | A | D |
| | 0 1 1 | A | A | A | A |
| | 1 0 0 | Unused (Reserved) | | | |
| | 1 0 1 | Unused (Reserved) | | | |
| | 1 1 0 | Unused (Reserved) | | | |
| | 1 1 1 | Unused (Reserved) | | | |

A = Activate; D = De-activate

According to an example embodiment, the total number of carriers or bundled (or paired) carriers (e.g. N) may be greater than a threshold such as a threshold L defined as $\lfloor \log_2(\text{total number of HS-SCCH orders that can be used for carrier activation/deactivation}) \rfloor$ (or the current total order bits), where the notation of $\lfloor x \rfloor$ may be a function floor(x) such that x may be rounded down to the nearest integer. The threshold L may indicate the maximum number of carriers or bundled (or paired) carriers that may be simultaneously activated/deactivated by a single HS-SCCH order given the total number of HS-SCCH orders that may be used for carrier activation/deactivation in MC-HSDPA (e.g. considering 6-bit HS-SCCH order used in 4C-HSDPA, and 8 HS-SCCH orders for other purposes, there are 56 HS-SCCH orders available for carrier activation/deactivation such that the threshold L=$\lfloor \log_2 56 \rfloor$=5), to activate/deactivate all configured secondary carriers in MC-HSDPA (e.g., 8C-HSDPA) with N bundled/paired carriers when DC-HSDPA may be configured, a HS-SCCH order for activation/deactivation of secondary serving HS-DSCH cells and a secondary uplink frequency may be configured, provided, and implemented using one or more of the following methods described herein.

For example, in one embodiment, the total order bits of a HS-SCCH order may be extended from the current total order bits or the threshold (e.g. 5) to the total number of carriers or bundled (or paired) carriers (e.g., N) in MC-HSDPA (e.g. from 6 to N (where N may be the total number of carriers or bundled/paired carriers in MC-HSDPA)) by reinterpreting (N-current total order bits) bits from one or more available, enabled for other purposes than carrier activation/deactivation, reserved, or unused fields of an HS-SCCH order such as transport block size information, or new data indicator when the UE is not configured with MIMO. For example, in MC-HSDPA with N=8 bundled carriers, a 6-bit HS-SCCH order that may be used in 4C-HSDPA and a threshold less than N (e.g. the threshold L may be 5 and N>L), the total order bits of an HS-SCCH order may be extended from 6 to N (e.g. 8) or (N-6) such that 2 additional bits may be reinterpreted from other fields or bits such as the 5th and 6th bits of trans port block size (TBS) when N=8. In such an embodiment, current 6-bit TBS values that may be used for other purposes such as TBS bits may be set to 111111 for a HS-DSCH retransmission where the Node-B or eNB may select a combination for which no mapping may exist between the original transport block size and the selected combination of channelization Code set and modulation type, or TBS bits may be set to 111110 for the retransmissions of HS-SCCH less transmissions, may be reused for a HS-SCCH order (e.g. an 8 bits HS-SCCH order). The extended order bits may be used to activate and/or deactivate secondary carriers along with the existing 6 order bits including 3 bit order type and 3 bit order. The HS-SCCH order (e.g. the 8 bits HS-SCCH order) may be transmitted or signaled along with the extended order bits.

ATFRI value (i.e. a 6bit TBS) corresponding to HS-SCCH order with extended order bits may be used in one embodiment as described herein. According to another embodiment, a TRFI value (i.e., TBS bits) may be set to 111101 for a HS-SCCH order such that resulting in a a new UE procedure for receiving HS-SCCH may be implemented and used as described herein below. A UE may receive the HS-SCCH order (e.g. the 8 bits HS-SCCH order), may process or execute the HS-SCCH order, and may respond to the HS-SCCH order. For example, if a UE may detect that one of the monitored HS-SCCHs in a sub-frame n may carry consistent control information intended for the UE and if a CRC of the HS-SCCH may be OK, a UE_DTX_DRX_Enabled may be TRUE or HS-SCCH_less_mode=1 or Secondary_Cell_Enabled may not 0, and the 'channelization-code-set information' and 'modulation scheme information' correspond to an HS-SCCH order, then the UE may transmit ACK information in the slot allocated to the HARQ-ACK in the corresponding HS-DPCCH sub-frame and process the HS-SCCH orders. Otherwise, the UE may discard the information received on the HS-SCCH.

Alternatively, the UE may maintain the same UE procedure for receiving a HS-SCCH order, but a TFRI value related to 2 bits of a TBS used for a 8 bit HS-SCCH order may be defined to correspond to the 8bit HS-SCCH order described herein. For example, a 6-bit TBS carrying a hard-coded unique TFRI value for a 6-bit HS-SCCH order (i.e., 111101) may be redefined as two parts: one part (e.g. a first part) includes the first 4 bits of TBS, denoted as $x_{tbs,1}$, $x_{tbs,2}$, $x_{tbs,4}$ and may be set to 1111; the other part (e.g. a second part) includes the $5^{th}$ and $6^{th}$ bit of TBS, denoted as $x_{tbs,5}$, $_{tbs,6}$ and may be set to 2 extended order bit, which may be named as 2-bit extended order type or extend order for 8-bit HS-SCCH order and could be any of 4 values such as "00", "01", "10" and "11". According to one embodiment, for backward compatibility, two extended order bit may be set to "01" for a 8-bit HS-SCCH order such that current carrier activation/deactivation may be resused (e.g. current 4C-HSDPA carrier activation/deactivation may be reused for 8C-HSDPA).

In another embodiment, instead of using a single HS-SCCH order, multiple HS-SCCH orders may be used for activation/deactivation of secondary carriers in MC-HSDPA with N bundled or paired carriers.

Based on the number of carrier configurations, a plurality of tables corresponding to 4C-HSDPA (i.e., Secondary_Cell_Enabled is less than 4) and 8C-HSDPA (i.e., Secondary_Cell_Enabled is great than 3) with bundled or paired carriers may be used. For example, when 4C-HSDPA may be configured, an order mapping table defining the orders for activation and deactivation of secondary serving HS-DSCH cells and a secondary uplink frequency for 4C-HSDPA may be used, while the order mapping tables, for example, shown in Tables 3 and/or 4 may be used when 8C-HSDPA with bundled or paired carriers may be configured.

Although the methods and embodiments may be described herein for carrier activation/deactivation in MC-HSDPA with bundled or paired carriers, such methods and embodiments may also be used for carrier activation/deactivation in MC-HSDPA (e.g., 8C-HSDPA) without bundled or paired carriers, for example, when N=M such that no carriers in MC-HSDPA may be bundled or paired; or when replacing a group of bundled or paired carriers with a single carrier; and/or when directly being used to activate/deactivate secondary carriers in 8C-HSDPA on per-group basis (e.g. bundled or paired carriers may be treated as a group of carriers to be activated/deactivated although physically spanning one TrBlk across bundled or paired carrier in downlink transmission may not occur). For example, if N=M=8 such that no carriers in 8C-HSDPA are bundled or paired, the methods and embodiments described above may be used for 8C-HSDPA without bundling or pairing carriers, such as using a single 8-bit HS-SCCH order with 2 extended order bit field to simultaneously activate/deactivate configured secondary serving HS-DSCH cells and secondary uplink frequency that may make a transition between two allowed or enabled carrier activation/deactivation states within a TTI possible, and two look-up order tables based on the number of carrier configuration (e.g., one table for the case when Secondary_Cell_Enabled may be less than 4, and the other for the case that Secondary_Cell_Enabled may be greater than 3.).

According to one embodiment, independent HS-SCCH orders (e.g. two independent HS-SCCH orders) may be sent to activate/deactivate one or more of the configured secondary carriers in MC-HSDPA such as 8C-HSDPA. For example, HS-SCCH orders (e.g. two or more HS-SCCH orders) may be simultaneously sent on different carriers (or serving HS-DSCH cells), may be simultaneously sent with different channelization codes, and/or may be simultaneously sent on different sub-frames.

If HS-SCCH orders may be sent on different carriers (or serving HS-DSCH cells) and a UE may have a primary carrier (or a serving HS-DSCH cell) active (e.g. when Secondary_Cell_Active may be 0), two HS-SCCH orders may not be simultaneously sent on different carriers (e.g. there may be one carrier).

To enable HS-SCCH orders to be simultaneously sent on different carriers (or serving HS-DSCH cells), activation of up to 4 secondary for a UE in a single sub-frame or transmission time interval (TTI) may be used. For example, two TTIs may be used to move a UE from a primary carrier active state to a multiple carrier active state that may call for and/or use multiple HS-SCCH orders (e.g. two HS-SCCH orders).

Additionally, to enable HS-SCCH orders to be simultaneously sent on different carriers (or serving HS-DSCH cells), the wireless communication network such as the communications network 100 may maintain and provide at least 2 active carriers such that the wireless communication system may able to activate/deactivate a carrier configuration (e.g., go between any two allowed states) in 1 TTI thereby using multiple HS-SCCH orders (e.g. two HS-SCCH).

In an another embodiment, when the UE may be in 8C-HSDPA mode with the primary carrier active, to transit from the primary carrier active state to a multiple carrier active state that may call for two HS-SCCH orders in 1 single TTI, a UE may be configured or able to receive two sequential orders before transmitting a HARQ-ACK acknowledging the reception of the two orders in a HARQ-ACK field of a first received HS-SCCH order with, for example, timing corresponding to the first received HS-SCCH order. The HARQ-ACK may be transmitted if both orders may be successfully received. The UE may apply two sequential orders 12 slots after the end of the HS-SCCH subframe that may deliver the first HS-SCCH order if the UE may not be configured with multiple uplink frequencies (or 18 slots after the end of the HS-SCCH subframe that may deliver the order if the UE may be configured with multiple uplink frequencies) and transient behavior such as a HS-DPCCH format change related to such a change (e.g. a change in the number of cells activated due to reception of a HS-SCCH order for carrier activation/deactivation) may take place before applying the two sequential orders. According to an example embodiment, the behavior may be identical to the currently specified UE behavior when the UE receives a single order. Additionally, a corresponding change of a HS-DPCCH channel coding scheme may be applied by a UE at the first HS-DPCCH subframe boundary after the activation/deactivation may be applied.

Figure 9:
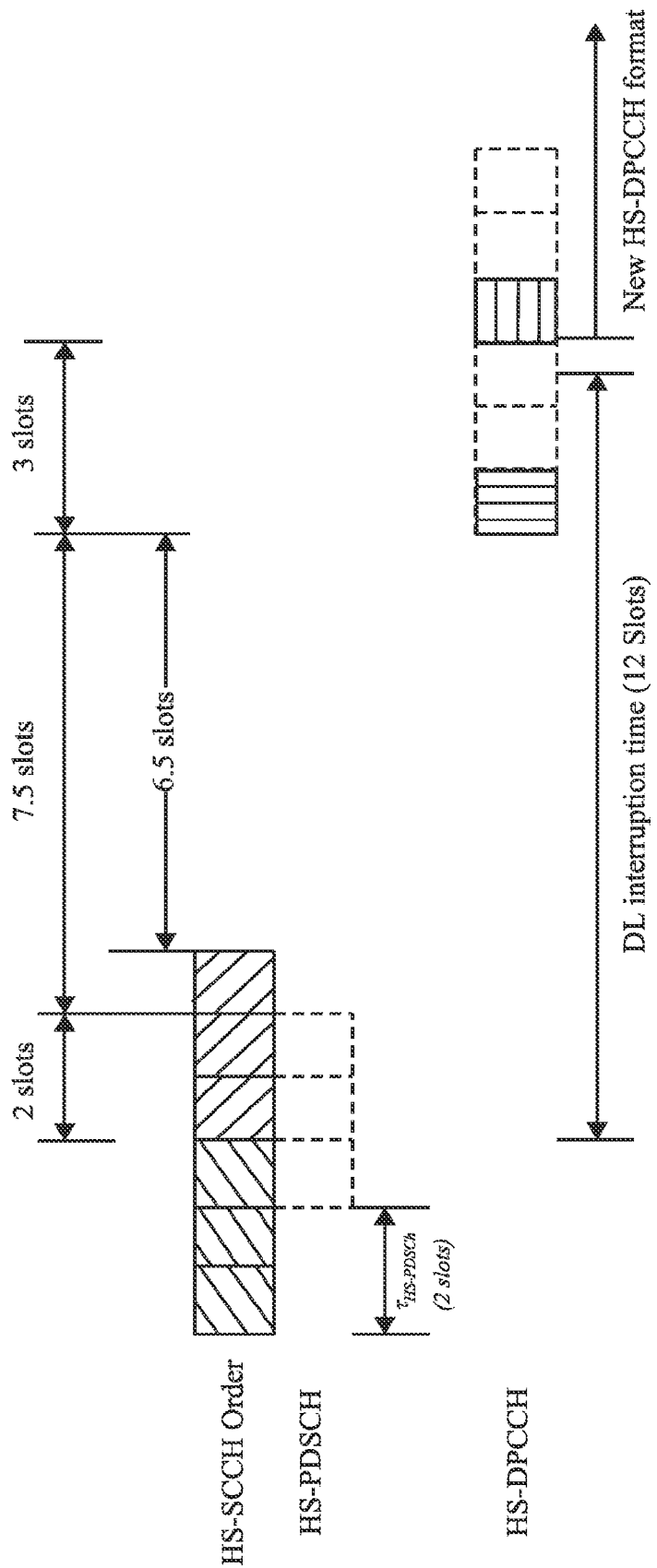
FIG. 9 illustrates an example embodiment of a transmission timeline from 1DL to Multiple DL by two HS-SCCH orders in 8C-HSDPA configured with 1UL frequency.
Figure 10:
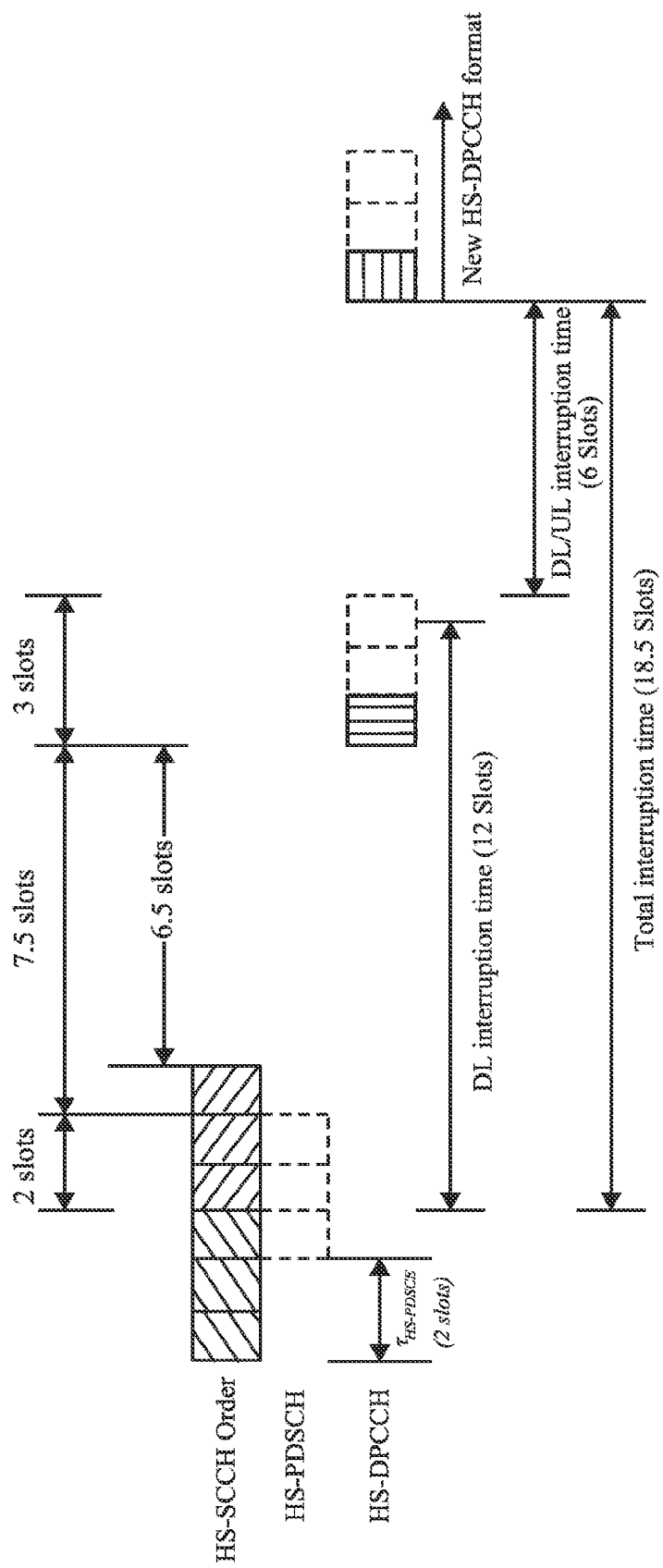
FIG. 10 illustrates an example embodiment of a transmission timeline from 1DL to Multiple DL by two HS-SCCH orders in 8C-HSDPA configured with 2UL frequencies.

FIG. 9 and FIG. 10, respectively, illustrate example embodiments of transmission timelines from 1 active DL carrier (e.g. a primary carrier or a serving HS-DSCH cell being active) to multiple active DL carriers by using two sequential HS-SCCH orders in 8C-HSDPA configured respectively with 1 and 2 UL frequencies (e.g. respectively configured with SC-HSUPA and DC-HSUPA). As shown in FIG. 9 and 10, a first and second HS-SCCH order may be sent over two consecutive TTIs such as TTI n and TTI (n+1). As such, a UE may decode the second HS-SCCH order within, for example, 6.5 slots rather than 7.5 slots that may be used for HS-PDSCH data demodulation and decoding. According to an example embodiment, HS-SCCH orders may be sent over two consecutive TTs and a UE may decode a UE may be rule may be used for orders for activation/deactivation of, for example, 8C-HSDPA secondary carriers regardless or independent of which carrier the order may be sent or transmitted on.

Alternatively, a complex acknowledgement process may be defined such that transmission of a composite HARQ-ACK acknowledging sequential HS-SCCH orders (e.g. two sequential orders) may be independently ACKed or combined with timing corresponding to a first received HS-SCCH order. For example, in 4C-HSDPA, after a UE receives a HS-SCCH order, the UE may transmit either ACK information or DTX in a slot allocated to a HARQ-ACK in a corresponding HS-DPCCH sub-frame.

According to one embodiment, a UE may report a composite HARQ-ACK that may acknowledge sequential HS-SCCH orders by one or more of the methods disclosed herein. For example, in one embodiment, the composite HARQ-ACK (e.g. that may be acknowledging) may be determined based on criteria (e.g. composite HARQ-ACK criteria) and in terms of two individual HARQ-ACK acknowledgments and two sequential HS-SCCH orders. The criteria may include that at least one of the HS-SCCH orders (e.g. two sequential HS-SCCH orders) may be successfully received, for example, by a UE. If at least one of the HS-SCCH orders may be successfully received, the UE may transmit ACK information. If at least of the HS-SCCH orders may not be successfully received, the UE may invoke Discontinuous Transmission (DTX) that may be used to derive the composite HARQ-ACK acknowledgement by taking an "OR" operation of the HARQ-ACK acknowledging the first and second HS-SCCH orders as shown in Table 5. The criteria may also include that each of the HS-SCCH orders (e.g. two sequential HS-SCCH orders) may be successfully received by, for example, the UE. If each of the HS-SCCH orders may be successfully received, the UE may transmit ACK information. If each of the HS-SCCH orders may not be successfully received, the UE may invoke DTX that may be used to derive the composite HARQ-ACK It by taking an "AND" operation of the HARQ-ACK acknowledging a first and second HS-SCCH order as shown in Table 6.

TABLE 5

Example of composite HARQ-ACK codebook for two sequential HS-SCCH orders

| HARQ-ACK_composite | HARQ-ACK$_1$ | HARQ-ACK$_2$ |
| --- | --- | --- |
| ACK | ACK | ACK |
| ACK | ACK | DTX |
| ACK | DTX | ACK |
| DTX | DTX | DTX |

TABLE 6

Example of composite HARQ-ACK codebook for two sequential HS-SCCH orders

| HARQ-ACK_composite | HARQ-ACK$_1$ | HARQ-ACK$_2$ |
| --- | --- | --- |
| ACK | ACK | ACK |
| DTX | ACK | DTX |
| DTX | DTX | ACK |
| DTX | DTX | DTX |

The HARQ-ACK_composite shown in Tables 5 and 6 may be used to denote a composite HARQ-ACK acknowledgement to be reported/transmitted by a UE. Additionally, the HARQ-ACK1 and HARQ-ACK2 shown in Tables 5 and 6 may be used to denote a composite HARQ-ACK acknowledgement to the first and second received HS-SCCH orders.

According to another embodiment, four (4) composite HARQ-ACK acknowledgements such as ACK/ACK, DTX/ACK, ACK/DTX and DTX/DTX may be reported (e.g. explicitly) by one or more of the following: reinterpreting HARQ-ACK codewords for a dual-stream MIMO configuration by mapping a primary and secondary stream respectively to first and second HS-SCCH orders; reducing a spreading factor of HARQ-ACK field by 2; and introducing four codewords in a codebook that may be further optimized respectively for HS-SCCH order or HS-PDSCH HARQ-ACK acknowledgement reporting. Reporting the four (4) composite HARQ-ACK acknowledgements using the foregoing may enable synchronization between a eNB or NodeB and a UE at a cost of additional power if, for example, a particular HARQ-ACK detection performance may be desired to be maintained due to an increase of a codebook size from 2 to 4.

In one embodiment, a single active carrier may be applied to, for example, 8C-HSDPA and to enable dual HS-SCCH orders (e.g. dual sequential HS-SCCH orders) as described herein. For example, when a UE may be configured in an 8C-HSDPA mode of operation, the UE may receive dual orders for carrier activation or deactivation. As such, a UE receiving a carrier activation/deactivation order may expect to receive another subsequent (or second) order that may include the additional activation/deactivation information. The UE may then ACK the initial order if both orders may be received correctly. If the first order was not a carrier activation/deactivation order, then the UE may process the first order and may ACK or DTX the first order based on the reception thereof.

UL CLTD/MIMO may also be activated and/or deactivated by one or more components or multiple antennas in a UE of a wireless communication system such as the communication system 100. According to one embodiment, a UL CLTD/MIMO operation may be enabled/disabled (or activated/deactivated) via a higher layers signaling message. For example, an IE may be introduced on a RRC control signaling message. A RNC may transmit or send the RRC control signaling message that may include the IE to a UE. The UE may then extract the UL CLTD/MIMO mode configuration information from the RRC message that may include the IE.

Additionally, a parameter such as "Status of UL CLTD (or MIMO or CLTD/MIMO) configuration" that may be signaled to the physical layer in the UE and the Node B from higher layers (e.g. a RRC message) may be provided and used. The parameter "Status of UL CLTD (or MIMO or CLTD/MIMO) configuration" may be a binary value equal to 0 or 1, respectively, that may indicate disable or enable UL CLTD (or MIMO or CLTD/MIMO) mode or may indicate deactivation or activation of UL CLTD (or MIMO or CLTD/MIMO).

UL CLTD/MIMO may also be activated/deactivated by a L1 HS-SCCH order. To activate/deactivate UL CLTD/MIMO using a L1 HS-SCCH order, a bit of the L1 HS-SCCH order may be used to activate/deactivate UL CLTD. The bit of the L1 HS-SCCH order that may be used may be a binary value equal to 1 or 0, respectively, that may indicate to activate or deactivate UL CLTD. When a UE may be configured with UL MIMO, the bit of the L1 HS-SCCH order may be used to activate/deactivate transmit diversity (and revert back to a 1 transmit antenna operation) and may be used activate/deactivate both UL CLTD and UL MIMO together.

According to an example embodiment, when the bit of the L1 HS-SSCH order may be 1, UL transmit diversity (and UL CLTD and MIMO) may be activated. Additionally, when the bit of the L1 HS-SCCH order may be 1, either UL CLTD or UL MIMO may be activated (e.g. implicitly) based on the number of streams scheduled or configured. When a single stream or dual streams may be scheduled or configured, UL CLTD or UL MIMO may be activated respectively. In another embodiment, when the bit may be equal to 0, UL transmit diversity (and e.g. both UL CLTD and MIMO) may be deactivated, for example, if the UE may be in either UL CLTD or UL MIMO mode.

According to another embodiment, to activate/deactivate UL CLTD/MIMO using a L1 HS-SCCH order, 2 bits of the L1 HS-SCCH order. For example, a first bit may be used to control UL CLTD activation/deactivation (or control activation/deactivation of a first or primary stream when a UE may be configured in UL MIMO mode), and a second bit (or the remaining bit) may be used to control activation/deactivation of a second stream when UE may be configured in UL MIMO mode.

To implement a HS-SCCH order for activation/deactivation of UL CLTD/MIMO in 8C-HSDPA, currently available HS-SCCH order mapping tables may be reused or reinterpreted in 8C-HSDPA, for example, with carrier reduction in activation/deactivation via bundled or paired carriers. Additionally, the availability of bits such as a bit or two (2) bits or the type of bits may be determined from an order type and/or an order to activate/deactivate UL CLTD/MIMO. For example, a bit may be determined along with the availability thereof. In one embodiment, the bit may be a most significant bit (MSB) of an order type that may be defined as follows: UL CLTD/MIMO activation (1 bit) where $x_{odt,1} = x_{UL\_CLTD/MIMO,1}$; if $x_{UL\_CLTD/MIMO,1} = $ '0', the HS-SCCH order may be a UL CLTD/MIMO deactivation order; and if $x_{UL\_CLTD/MIMO,1} = $ '1', then the HS-SCCH order may be a UL CLTD/MIMO Activation order. According to another embodiment, the bit may be a LSB of an order when an order type $(x_{odt,1}, x_{odt,2}, x_{odt,3}) = $ '010' that may be defined as follows: UL CLTD/MIMO activation (1 bit) where, $x_{ord,3} = x_{UL\_CLTD/MIMO,1}$; if $x_{UL\_CLTD/MIMO,1} = $ '0', the HS-SCCH order may be a UL CLTD/MIMO deactivation order; and if $x_{UL\_CLTD/MIMO,1} = $ '1', the HS-SCCH order may be a UL CLTD/MIMO activation order.

An availability of two (2) bits that may be used to activate/deactivate UL CLTD/MIMO may also be determined The two (2) bits may be the last two bits of an order $(x_{ord,2}, x_{ord,3})$ when an order type may be $(x_{odt,1}, x_{odt,2}, x_{odt,3}) = $ '010'. For example, Unused (Reserved) commands (e.g. and the two bits associated therewith) shown in Tables 3 and 4 above may be used for activation/deactivation of UL CLTD/MIMO.

According to another embodiment, to implement a HS-SCCH order for activation/deactivation of UL CLTD/MIMO and/or activation/deactivation of a secondary carrier in 8C-HSDPA, HS-SCCH order signaling capabilities may be increased by extending order bits to a higher value (e.g. increasing the currently available 6 bits to, for example, 7 or 8 bits). In such an embodiment, a 1 or 2 bit method of activation/deactivation of UL CLTD may be treated as activation/deactivation of additional 1 or 2 secondary carriers respectively, and, thus, methods used for activation/deactivation of MC-HSDPA may be reused by increasing M by 2.

UE antenna operations may also be controlled via one or more HS-SCCH orders. For example, in addition to activation/deactivation of UL CLTD and/or UL MIMO operations, antenna operations at the UE may also be controlled. Table 8 includes example UL CLTD antenna configurations at a UE that may be controlled via one or more HS-SCCH orders.

TABLE 7A

Example UL CLTD Antenna Configurations

| Configuration # | Conventional channels (DPCCH, E-DPCCH, E-DPDCH, DPDCH, HS-DPCCH) | S-DPCCH |
|---|---|---|
| 1 | Primary precoding vector | Secondary precoding vector |
| 2 | Physical Antenna 1 | Physical Antenna 2 |
| 3 | Physical Antenna 2 | Physical Antenna 1 |
| 4 | Physical Antenna 1 | De-activated |
| 5 | Physical Antenna 2 | De-activated |

According to an example embodiment, activation and/or deactivation of dual stream UL MIMO operations may also be used along with the configurations shown in Table 7A. For example, dual stream MIMO operations may be applicable to configurations 1, 2, or 3 shown in FIG. 7.

Additionally, configurations such as configurations 1-5 or a subset of configurations shown in Table 7A may also be used or applicable in, for example, single-stream MIMO operations and/or dual stream MIMO operations. For example, for UL CLTD or a single-stream MIMO, a subset of the configurations such as configurations 1, 4, or 5 shown in Table 7A may be used. Additionally, for UL CLTD or a single-stream MIMO, a subset of the configurations such as configurations 1, 4, 2, or 3 shown in Table 7A may be used. Also, for UL CLTD or a single-stream MIMO, a subset of the configuration such as configurations 1 and 4 shown in Table 7A may be used. In one embodiment, when UL MIMO may be configured or enabled, configurations 1, 2, or 3 shown in Table 7A may be used in combination with an uplink MIMO.

Disclosed herein are also systems and/or methods for receiving and decoding HS-SCCH order bit(s) and systems and methods for mapping configurations, for example, at a UE are described. According to an example embodiment, an order bit x may be provided that may be defined as a HS-SCCH order bit (e.g., a bit that may be carried on the HS-SCCH order). The UE may be configured to receive such an order bit x via higher layer signaling.

In one embodiment, a single bit or order may be used per configuration. For example, a UE antenna configuration based HS-SCCH order for controlling of UE antenna operations (e.g. for UL CLTD/MIMO) may be provide using a single bit. According to an example embodiment, a HS-SCCH order bit mapping may be such that each configuration (e.g. a subset of the entries in Table 7A) that may be used may be assigned one order bit. In such an embodiment, a single bit of the used configuration bits may be set at a time. Such particular restriction may add robustness to the HS-SCCH order message and also improve reliability.

In another example embodiment, each of the 5 configurations shown in Table 7A may be used and five (5) bits may be used to enable a specific configuration. Such a mapping may be implemented, for example, using currently available 6-bit order mapping tables by setting $x_{odt,1}$ to 1 and mapping remaining order bits (5 bits—$x_{odt,2}$; $x_{odt,3}$; $x_{ord,1}$; $x_{ord,2}$; $x_{ord,3}$) to the 5 configurations shown in, for example, Table 7A. A mapping may assign a pre-defined or specified order by setting $x_{odt,1}$ to 0. Additionally, single bit to configuration mapping may be implemented in an 8-bit order mapping table by choosing 5 of the 8 order bits. The 5 five selected order bits may be mapped to the 5 configurations shown in Table 7A in a pre-defined or specified order.

According to another embodiment, an additional bit for activation of UL MIMO may be used. For example, 6 bits may be used to signal combinations of configurations that may be used by a UE to enable UL CLTD/UL MIMO, various control and data channels, various streams or carriers, and the like (e.g., 5 bits—one for each configuration, and sixth bit (additional bit) for activation/deactivation of UL MIMO). In one embodiment, a subset of the combinations of bits may not be allowed, enabled, and used by a UE. For example, UL MIMO may not be allowed to be activated when a UE may be configured without S-DPCCH activated (e.g., configurations 4 and/or 5 shown in Table 7A).

The additional bit that may be used for activation of UL MIMO may be implemented in an 8-bit order mapping table. For example, a 8-bit order mapping may be implemented by setting 2 bits of TBS, for example the 5th and 6th TBS bits ($x_{tbs,5}$, $x_{tbs,6}$) to a predefined value that may be different from values that may already be used for other purposes such as ($x_{tbs,5}$, $x_{tbs,6}$)='01' that may be used (e.g. already used) to indicate a HS-SCCH order for activation/deactivation of DTX, DRX, HS-SCCH-less operations and for HS-DSCH serving cell changes and an order for activation and deactivation of secondary serving HS-DSCH cells and secondary uplink Frequency. As such ($x_{tbs,5}$, $x_{tbs,6}$) may be set to another value such as '00', '10' or '11' to indicate the order for controlling the antenna operations for UL CLTD and/or UL MIMO.

In another example embodiment, activation and/or deactivation of each allowed configuration (e.g., a subset of the configurations shown in Table 7A) may be controlled by a unique HS-SCCH order that may not be used for other purposes such as activation/deactivation of DTX, DRX, HS-SCCH-less operations and for HS-DSCH serving cell changes and an order for activation and deactivation of secondary serving HS-DSCH cells and secondary uplink frequency. The unique HS-SCCH order may be implemented in either a 6-bit or 8-bit order mapping table. For example, using one order per configuration (or state), the total number of required orders may be twice the number of the allowed or useable configurations if the activation and/or deactivation of a configuration may be implemented using two different orders. Alternatively, the total number of orders may be the same as the number of the allowed or useable configurations if the activation and/or deactivation of a configuration uses one toggled (e.g., two states) order. According to one embodiment, there may be 44 (64 possible minus 12 used and minus 8 reserved) unused orders a 6-bit order mapping table, and there may be 56 (256 possible minus 192 used and minus 8 reserved) unused orders in a 8-bit order mapping table. Thus, a single order per configuration may be chosen from such available unused orders. According to additional embodiment, other approaches may also be used, which will be described below.

The configurations may also be mapped to UE states such that control of UE antennas as well as activation and/or deactivation of UL CLTD/UL MIMO operations may be based on a state (e.g. a current state) of a UE. The UE may receive an indication of a state (or configuration) to operate in from an eNB or NodeB, may determine the configuration based on and associated with the indication, and may apply the state (or configuration). For example, state-based HS-SCCH order mapping for controlling (e.g. activation/deactivation) of UL CLTD and/or MIMO (or switching UL CLTD activation states) may be provided a HS-SCCH order such that a number of bits may be signaled to represent a state. In particular, if the total number of states (or configurations) may K (e.g. where K may be an integer), the states (or configurations) may be represented by ⌈log₂K⌉ (e.g. ceiling(log₂(K)) or round log₂ (K) up to the nearest integer) bits. HS-SCCH order bits may then be used to transmit an indication of a state to a UE. For example, order bits ($x_{ord,1}$, $x_{ord,2}$, $x_{ord,3}$) or order type ($x_{odt,1}$, $x_{odt,2}$, $x_{odt,3}$) in a 6-bit or 8-bit order mapping table may be used to indicate a state to a UE. Extended order bits from TBS field ($x_{tbs,5}$, $x_{tbs,6}$) in 8-bit order mapping table may also be used to transmit and indicate a state to a UE. The mapping between order bits and states may be in a predefined or specified order according to one embodiment.

The UE may be configured to receive a HS-SCCH order where the combinations of the order bits indicate a particular UE antenna configuration/state. For example, configurations 1, 4, and/or 5 shown in Table 7A may be encoded using two order bits as shown in Table 8. The two order bits may be mapped to a configuration used to indicate the particular UE antenna configuration/state. In addition to the mappings shown in Table 8, the mappings in Tables 9-10 shown below may also be used to indicate a state or configuration.

TABLE 8

Example state-based order mapping

| Order bit 1 | Order bit 2 | Configuration (e.g., Table 7A) |
|---|---|---|
| 0 | 0 | 4 (UL CLTD deactivated - primary antenna used) |
| 0 | 1 | 5 (UL CLTD deactivated - secondary antenna used) |
| 1 | 0 | 1 (UL CLTD activated, UL MIMO deactivated) |
| 1 | 1 | Reserved |

The mappings (e.g. shown in Tables 8-10) may also be interpreted as having one bit to enable UL CLTD operations (e.g., order bit 1) and another bit to indicate which antenna to use when UL CLTD may not be activated (e.g., order bit 2).

According to another example embodiment, the 4th entry in, for example, a mapping table may be used to activate UL MIMO operations. As shown in Table 9, such a configuration or state (e.g. activating UL MIMO operations) may be implemented using two bits such as '11.'

TABLE 9

Example state-based order mapping with UL MIMO

| Order bit 1 | Order bit 2 | Configuration (e.g., Table 7A) |
|---|---|---|
| 0 | 0 | 4 (UL CLTD deactivated - primary antenna is used) |
| 0 | 1 | 5 (UL CLTD deactivated - secondary antenna is used) |
| 1 | 0 | 1 (UL CLTD activated, UL MIMO deactivated) |
| 1 | 1 | UL MIMO activated. |

UL MIMO operations may be a superset of UL CLTD operations, for example, when UL MIMO may be activated and a UE may transmit one or two streams. Additionally, UL CLTD may become a fall back mode of UL MIMO operations when a single stream may be supported by the channel.

To provide two HS-SCCH order bits to implement the control signalling for CLTD and/or MIMO in the existing HS-SCCH order frame, an unused HS-SCCH order type/order bit combination may be used. For example, an order type $x_{odt,1}$, $x_{odt,2}$, $x_{odt,3}$='011' may be unused. Such an order type $x_{odt,1}$, $x_{odt,2}$, $x_{odt,3}$='011' may be used in combination with two of, for example, three available order bits such that when a UE decodes order type '011', the information carried on the associated order bits may be mapped according to Table 8 or Table 9, for example.

Another example of 5 configurations for controlling/switching UL CLTD activation states in Table 7A may be implemented by 3 HS-SCCH order bits ($x_{ord,1}$, $x_{ord,2}$, $x_{ord,3}$) combined with an unused HS-SCCH order type $x_{odt,1}$, $x_{odt,2}$, $x_{odt,3}$='011'. Table 7B illustrates an example embodiment of 5 orders in a 6-bit order mapping table that may be used by, for example, a UE or other component of a wireless communication system such as the communication system 100 to control or switch the UE between UL CLTD states. According to an example embodiment, the UE may receive the order type and order mapping (or order bits) carried on the HS-SCCH order, may compare the received order type and order mapping with order types and order mappings in a mapping table, and may access any of the UL CLTD activation states in the mapping table where the received order type and order mapping (or order bits) matches one of the order types and order mappings (or order bits) in the mapping table.

TABLE 7B

Orders for UE when UL CLTD may be configured

| Order Type $x_{odt,1}$, $x_{odt,2}$, $x_{odt,3}$ | Order Mapping/Bit | | | Activation Status | | | | |
|---|---|---|---|---|---|---|---|---|
| | | | | CLTD | Single Tx on Antenna 1 with S-DPCCH on Antenna 2 | Single Tx on Antenna 2 with S-DPCCH on Antenna 1 | Single Tx on Antenna 1 with no S-DPCCH | Single Tx on Antenna 2 with no S-DPCCH |
| $x_{odt,3}$ | $x_{ord,1}$ | $x_{ord,2}$ | $x_{ord,3}$ | | | | | |
| 011 | 1 | 1 | 1 | A | D | D | D | D |
| | 1 | 0 | 1 | D | A | D | D | D |
| | 1 | 1 | 0 | D | D | A | D | D |
| | 0 | 0 | 1 | D | D | D | A | D |
| | 0 | 1 | 0 | D | D | D | D | A |
| | 0 | 0 | 0 | | Unused (Reserved) | | | |
| | 0 | 1 | 1 | | Unused (Reserved) | | | |
| | 1 | 0 | 0 | | Unused (Reserved) | | | |

A = Activate; D = De-activate

The currently unused combinations with order type '010' may also be used to provide two HS-SCCH order bits to implement the control signalling for CLTD and/or MIMO in the existing HS-SCCH order frame. In such an embodiment, when the UE decodes order type $x_{odt,1}$, $x_{odt,2}$, $x_{odt,3}$='010' with $x_{ord,1}$=1, then the two other order bits $x_{ord,2}$ and $x_{ord,3}$ may be mapped according to order bit 1 and order bit 2 shown in Table 8 or Table 9.

In another example embodiment, one order bit may be used to signal activation and deactivation of UL CLTD. Additionally, an actual configuration may be signalled using a different subset of bits in a state-based approach. For example, order bit 1 may be a UL CLTD operations activation bit such that UL CLTD may be activated when order bit 1 may be set to 1 and deactivated otherwise (e.g. if order bit 1 may be set to 0, a UE may be configured with configuration 4 such that UL CLTD may be deactivated altogether. In such an embodiment, order bit 2 and order bit 3 may be unused and reserved.

TABLE 10

Example Mapping with a UL CLTD Activation Bit

| Order bit 2 (e.g., $x_{ord,2}$) | Order bit 3 (e.g., $x_{ord,3}$) | Configuration (e.g., Table 7A) |
| --- | --- | --- |
| 0 | 0 | 1 |
| 0 | 1 | 2 |
| 1 | 0 | 3 |
| 1 | 1 | 4 |

Separate bits for UL CLTD, antenna selection, S-DPCCH activation, and/or UL MIMO may be signaled and used to indicate one or more configurations. For example, the UE may be configured to receive up to 4 order bits. One bit of the four order bits may be used to signal each aspect of the control. For example, order bit 1 may be a UL CLTD bit and may control UL CLTD activation/deactivation, order bit 2 may be an antenna bit that may control on which antenna the legacy channels may transmitted (e.g., when UL CLTD is deactivated), order bit 3 may be an S-DPCCH bit and may control the activation/deactivation of S-DPCCH, order bit 4 may be a UL MIMO bit and may control UL MIMO operations, and the like.

In one embodiment, one or more restrictions or restricted states of the order bit combinations may be provided or implemented such that orders that indicate restricted configurations may be ignored or prohibited (e.g. by a UE). For example, the UE may consider an antenna bit (order bit 2) and S-DPCCH bit (order bit 3) if (or on the condition that) UL CLTD may be deactivated (e.g. order bit 1 may be set to 0). Additionally, a UL MIMO bit may be set to 0 when UL CLTD may be deactivated and the UL MIMO bit may be set to 1 when UL CLTD may be activated such that the UE may ignore the restricted states of the UL CLTD.

Downlink signaling may also be used to specify and/or control a UE precoding table, for example, via HS-SCCH order signaling. To reduce the number of HS-SCCH orders used for configuration signaling, a multiple-codebook scheme for downlink signaling where each codebook may correspond to a class of antenna operations may be provided and used herein.

Figure 11:
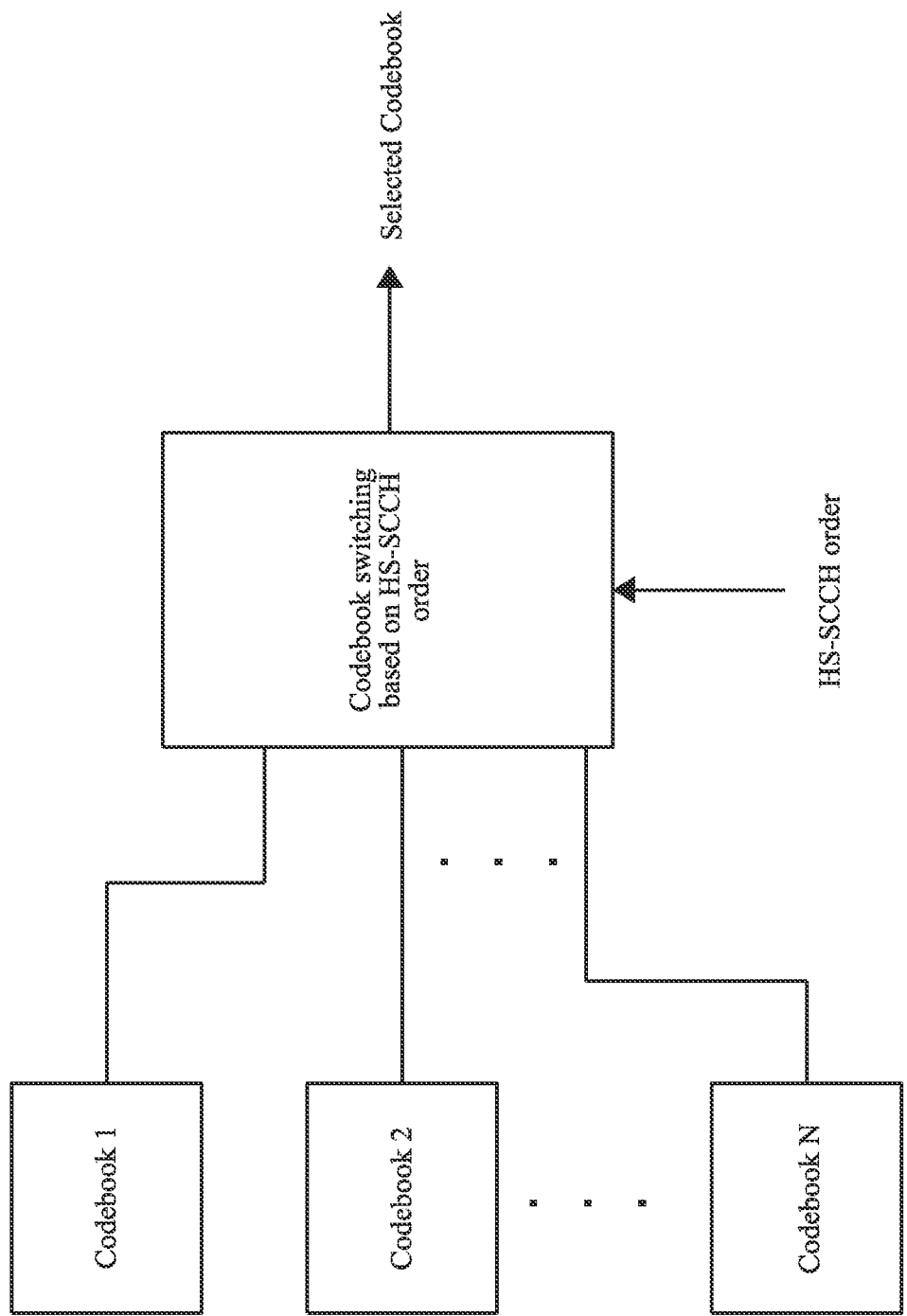
FIG. 11 illustrates an example embodiment of a codebook switching scheme based on a HS-SCCH order.

FIG. 11 illustrates an example embodiment of a multiple-codebook scheme that may be used for downlink signaling and, thus, specifying and/or controlling a UE precoding table. As shown in FIG. 11, each class of codebook may operate at different codeword update rates. When codebook switching occurs, for example, when a switch may be signaled via an HS-SCCH order, a power offset may be applied to a primary DPCCH before applying the new codebook for the upcoming uplink transmission.

Codebooks included in the multiple-codebook scheme may be switched to control the downlink signaling. In one embodiment, switching between different codebooks may be controlled by HS-SCCH order(s).

Figure 12:
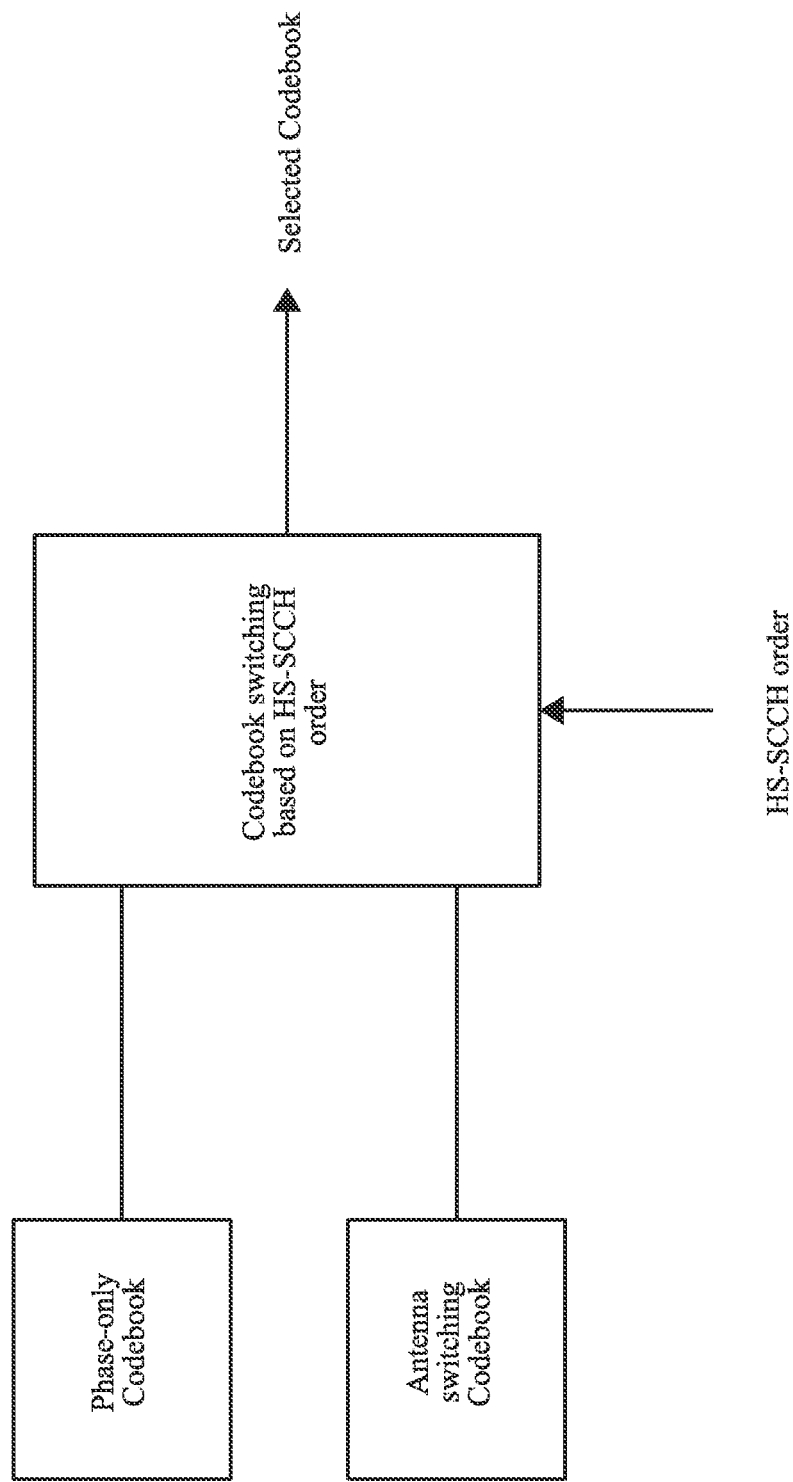
FIG. 12 illustrates an example embodiment of a dual codebook switching scheme based on a HS-SCCH order.

FIG. 12 illustrates an example embodiment of a dual-codebook switching scheme that may be used herein. As shown in FIG. 12, a phase-only codebook may be used to support a normal CLTD operation and an antenna switching codebook may be used to support antenna switching operation. The antenna switching codebook may include, for example, two or four code words. For an antenna switching operation, if configurations 2 and 3 may be supported but other configuration may not, the antenna switching codebook may include two code words. In another example, if configurations 2, 3, 4, and 5 may be supported, the antenna switching codebook may include four code words. For example, the four code words may be defined as $$\begin{bmatrix} 1 & 0 \\ 0 & 1 \end{bmatrix}, \begin{bmatrix} 0 & 1 \\ 1 & 0 \end{bmatrix}, \begin{bmatrix} 1 & 0 \\ 0 & 0 \end{bmatrix}, \begin{bmatrix} 0 & 0 \\ 1 & 0 \end{bmatrix}.$$

The antenna switching codebook may also operate at a lower codeword update rate than the phase-only codebook. Such an embodiment may be implemented with and using two HS-SCCH orders.

Figure 13:
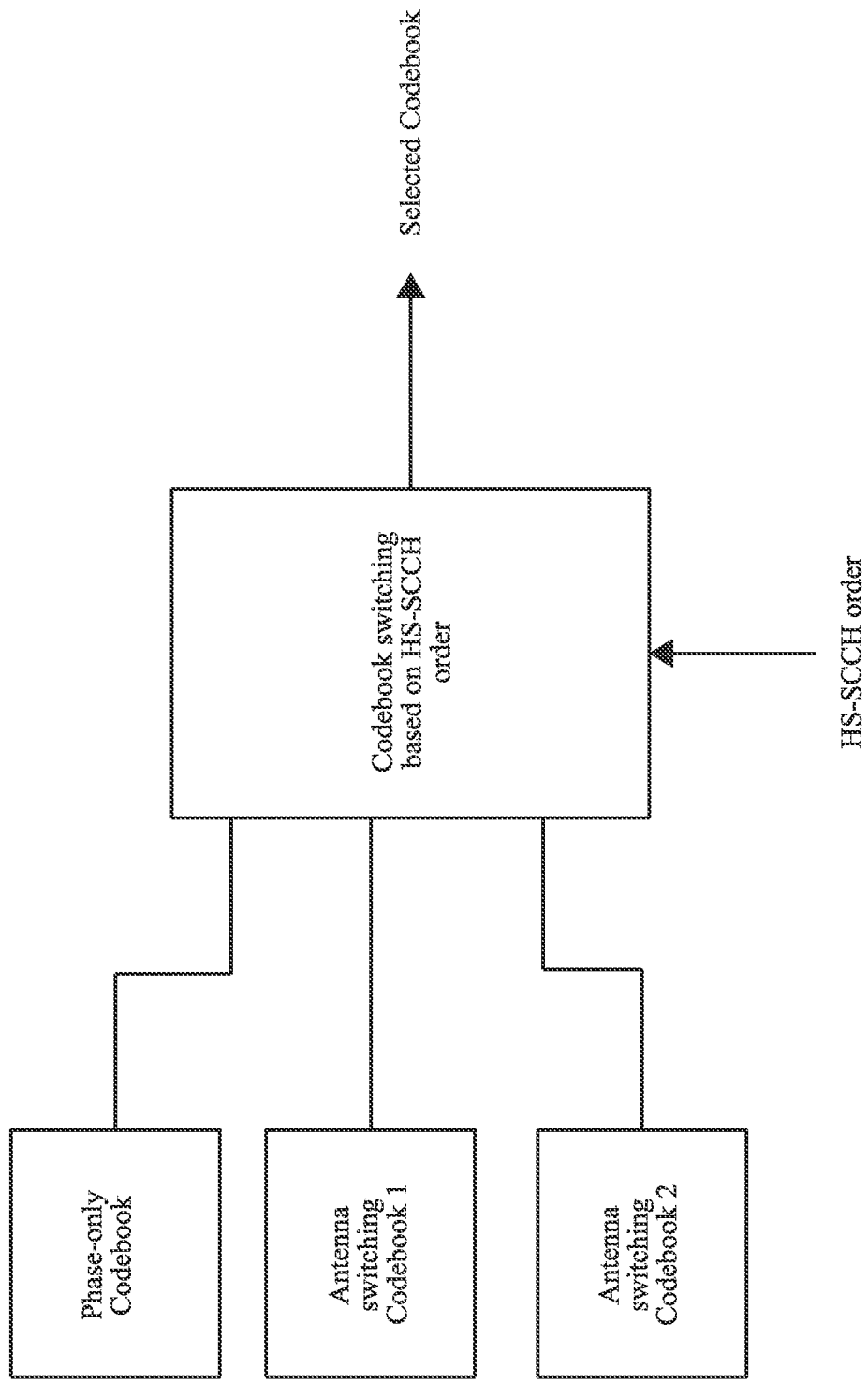
FIG. 13 illustrates an example embodiment of a three-codebook switching scheme based on a HS-SCCH order.

According to another embodiment, a three-codebook switching scheme may be implemented and used. FIG. 13 illustrates an example embodiment of a three-codebook switching scheme that may be used herein. As shown in FIG. 13, a phase-only codebook, for example, may used for normal CLTD operation. Additionally, two antenna switching codebooks may be used where one of the antenna switching codebooks may be for transmission of S-DPCCH (e.g., configurations 2 and 3) and the other antenna switching codebook may be for transmissions without S-DPCCH (e.g., configurations 4 and 5 described herein). In both antenna switching codebooks, two codewords may be provided in each codebook.

After a UE receives an HS-SCCH order instructing the UE to switch a codebook (e.g. as shown in FIGS. 12 and 13), the codebook switching operation may be applied by the UE at the earliest E-DCH TTI boundary coinciding with or following the beginning of the HS-DPCCH subframe containing the HARQ-ACK corresponding to the order. The precoding weight to be applied may be indicated by the downlink F-PCICH or DPCCH in response thereto. A power offset with respect to current DPCCH transmit power may also be applied to the upcoming UL DPCCH transmission, for example when a new codebook may be applied for a first time. The UE may also start to follow a new PCI update rate/cycle.

In another example embodiment, an order mapping table for activation/deactivation of secondary carriers may be defined for 8C-HSDPA. For example, in 8C-HSDPA a single order may be provided with an extended order bit field that may be used for activation/deactivation of secondary carriers. The following equations may be used to provide such a single order with an extended order bit field. For example, for 4C-HSDPA:

$V=(D_2+U_2)+3D_3+6D_4+(1-D_4)(D_3+D_2U_2-D_3U_2-D_3D_2)(-1+D_2+U_2)$ $x_{ord}=(x_{odt,1},x_{odt,2},x_{odt,3},x_{ord,1},x_{ord,2},x_{ord,3})=\text{dec2bin}(V+8)$.

The following equations may also be applied and used to make 8C-HSDPA backward compatible with 4C-HSDPA:

$$X = V + 12D_5 + 24D_6 + 48D_7 + 96D_8$$

$$x_{ord} = (x_{tbs,5}, x_{tbs,6}, x_{odt,1}, x_{odt,2}, x_{odt,3}, x_{ord,1}, x_{ord,2}, x_{ord,3}) = \text{dec2bin}(\text{mod}(X+72, 192)).$$

where $D_k$ and $U_k$ may represent the desired activation status of downlink and uplink carrier k, where 1 may represent activated and 0 may represent not activated.

Additional example order mapping table formats and equations for carrier activation/deactivation in 8C-HSDPA may be defined. For example, for 6-bit HS-SCCH order for 4C-HSDPA, TBS bits (6 bits) may be set to '111101,' which may be translated to 8-bit HS-SCCH order as '01xxxxxx.' Backwards compatibility with 4C-HSDPA orders in the 8-bit order mapping table with the extended bit field $(x_{tbs,5}, x_{tbs,6}) = \text{'}01\text{'}$ may also be maintained, for example, by applying the following equation:

$$x_{ord} = (x_{tbs,5}, x_{tbs,6}, x_{odt,1}, x_{odt,2}, x_{odt,3}, x_{ord,1}, x_{ord,2}, x_{ord,3}) = \text{dec2bin}(\text{mod}(X+72, 192))$$

For example, it may be determined by $$X + 72 = (V+8) + 64 = (V+8) + 2^6$$

where $2^6$ indicates $(x_{tbs,5}, x_{tbs,6}) = \text{'}01\text{'}.$ In order to start $(x_{tbs,5}, x_{tbs,6})$ from '00' in the 8-bit order mapping table, the new equation may be proposed for 8C-HSDPA as follows:

$$x_{ord} = (x_{tbs,5}, x_{tbs,6}, x_{odt,1}, x_{odt,2}, x_{odt,3}, x_{ord,1}, x_{ord,2}, x_{ord,3}) = \text{dec2bin}(\text{mod}(X+8, 192)).$$

In an example embodiment, where one order per configuration (or state) may be used, an 8-bit order mapping table may be defined and provided as described herein and above. The order mapping table may optionally be defined for activation/deactivation of UL CLTD/MIMO, rather than also addressing secondary carriers for 8C-HSDPA. As described above, the total number of HS-SCCH orders may be twice the number of the allowed configurations if the activation and deactivation of one configuration may be implemented using two different orders. Additionally, the total number of HS-SCCH orders may be the same as the number of allowed configurations if the activation and deactivation of one configuration may be signaled by a single order (e.g., the order toggles between active/de-active). Currently, there may be 44 (64 possible minus 12 used and minus 8 reserved) unused orders in 6-bit order mapping table, and there may be 56 (256 possible minus 192 used and minus 8 reserved) unused orders in 8-bit order mapping table as described above. As such, providing one order per configuration or state approach may be applied to both a 6-bit table and 8-bit table by selecting the number of orders from unused orders. In other examples, mappings may be defined as described above.

In an 8-bit order mapping table, equations for activation/deactivation of UL CLTD/MIMO may also be provided. For example, MIMO/CLTD deactivation and MIMO/CLTD activation may be provided and used (e.g. as such equations) to represent the desired activation status of UL CLTD where 1 may represent activated and 0 may represent not activated.

Order mapping tables may also be defined for activation/deactivation of UL CLTD/MIMO and secondary carriers for 8C-HSDPA. Examples of allocating HS-SCCH orders for activation/deactivation of UL CLTD/MIMO and of secondary carriers for 8C-HSDPA in 8-bit order mapping table may be defined as follows:

For example, HS-SCCH orders may be allocated in the order provided by 4C-HSDPA (e.g., starting the 5th and 6th bit of TBS='01') and 8C-HSDPA followed by UL CLTD/MIMO from top to bottom in the 8-bit order mapping table such that the order for activation/deactivation of UL CLTD/MIMO may be implemented in 8-bit order mapping table.

HS-SCCH orders may also be allocated in the order provided by 4C-HSDPA (e.g., starting the 5th and 6th bit of TBS='01') and UL CLTD/MIMO followed by 8C-HSDPA from top to bottom in the 8-bit order mapping table such that the order for activation/deactivation of UL CLTD/MIMO may be implemented in 6-bit order mapping table.

HS-SCCH orders may further be allocated in the order provided by 8C-HSDPA including 4C-HSDPA (e.g., starting the 5th and 6th bit of TBS='00') and followed by UL CLTD/MIMO from top to bottom in the 8-bit order mapping table such that the order for activation/deactivation of UL CLTD/MIMO may be implemented in 8-bit order mapping table.

Additionally, HS-SCCH orders may be allocated in the order provided by UL CLTD/MIMO (e.g., starting the 5th and 6th bit of TBS='00') and 8C-HSDPA including 4C-HSDPA (e.g., starting the 5th and 6th bit of TBS='01') from top to bottom in the 8-bit order mapping table.

According to an example embodiment, to support the same data rate in MC-HSDPA with a bundled or paired carrier and MC-HSDPA without a bundled or paired carrier, UE categories may be provided and introduced that may indicate that a UE may be capable of supporting the same data rates regardless of bundling or pairing. Such UE categories may be signaled (e.g. to a UE) through one or more bits that may be included in a RRC message. As such, CQI tables may be provided and introduced to support bigger TBS across multiple carriers resulting from such UE categories and the bits associated therewith.

Furthermore, since a TrBlk may span K carriers, feedback information such as HARQ-ACK and CQI may be reduced to 1 for K carriers without MIMO being configured and 2 for K carriers with MIMO being configured. However, the UE may still be able to measure and report K CQI values corresponding to K carriers to facilitate flexible HARQ scheduling at NodeB. In order to reduce the UL feedback and CQI load, K CQIs may be reported as the methods described herein: For example, for each bundled or paired carrier, 1 base CQI with higher granularity and K delta_CQIs corresponding to K carriers with lower granularity may be reported.

According to another embodiment, an E-TFC (e.g. an enhanced dedicated channel transport format combination (E-TFC)) or TFC (e.g. a transport format combination) restriction may be used and provided such that the E-TFC or TFC restriction may define an estimated HS-DPCCH transmit or transmission based on activation status of secondary serving cells (e.g. HS-DSCH cells) that may be provided in a HS-SCCH order or based on a RRC configuration as described above. Embodiments for cell activation status based HS-DPCCH transmit power ($P_{HS\text{-}DPCCH}$) and for transport format combination (TFC) selection in a UE for MC-HSDPA may be described herein hereafter.

For example, to maximize coverage, a UE may limit use of transport format combinations if may estimate that a certain TFC and E-TFC may use more power than a maximum transmit power. During such a procedure, the UE may estimate a HS-DPCCH transmit power ($P_{HS\text{-}DPCCH}$). The estimated HS-DPCCH transmit power ($P_{HS\text{-}DPCCH}$) may be based on a UE configuration such as that a UE may configured with MIMO without a DC-HSDPA mode or with a DC-HSDPA or DC-HSDPA-MIMO mode such that power offset settings may be selected to protect various scenarios. In MC-HSDPA (e.g., 4C-HSDPA and 8C-HSDPA), upon activation/deactivation of secondary serving HS-DSCH cells, different power offset settings may be used for HS-DPCCH transmission. To accurately estimate HS-DPCCH transmit power and, thus, optimize system performance in MC-HSDPA, $P_{HS\text{-}DPCCH}$ may be estimated based on the UE cell activation status or based on the number of active cells mapped to HS-DPCCH (or HS-DPCCH$_2$ if HS-DPCCH$_2$ may be configured and transmitted in 8C-HSDPA, or HS-DPCCH$_k$ if k HS-DPCCH may be configured and transmitted in MC-HSDPA). The estimated HS-DPCCH transmit power may be based on $P_{DPCCH,target}$ and the power offset setting for HS-DPCCH according to the latest UE cell activation status or the number of active cells mapped to HS-DPCCH (or HS-DPCCH$_2$ if HS-DPCCH$_2$ may be configured and transmitted in 8C-HSDPA, or HS-DPCCH$_k$ if k HS-DPCCH is configured and transmitted in MC-HSDPA) before or when the UE may estimate the HS-DPCCH transmit power.

In one embodiment, the estimated HS-DPCCH transmit power may be based on $P_{DPCCH,target}$ and the greatest of the power offset setting for HS-DPCCH according to a UE cell activation status before or when the UE estimates the HS-DPCCH transmit power. For example, if a UE may be configured with 8 carriers and may be in a MIMO mode, at TTI n, the number of active cells mapped to HS-DPCCH (or HS-DPCCH$_2$) may be 4 such that the estimated HS-DPCCH transmit power may be based on $P_{DPCCH,target}$ and the greatest of ($D_{ACK}$+2), ($D_{NACK}$+2) and ($D_{CQI}$+2) where $D_{ACK}$, $D_{NACK}$ and $D_{CQI}$ are the most recent signalled values; and at TTI (n+1), the number of active cells mapped to HS-DPCCH (or HS-DPCCH2) may be 2 such that the estimated HS-DPCCH transmit power may be based on $P_{DPCCH,target}$ and the greatest of ($D_{ACK}$+1), ($D_{NACK}$+1) and ($D_{CQI}$+1) where $D_{ACK}$, $D_{NACK}$ and $D_{CQI}$ are the most recent signalled values.

According to another embodiment, differences may be distinguished for CQI types A and/or B. For example, at TTI n, the number of active cells mapped to HS-DPCCH (or HS-DPCCH2) may be 4 such that the estimated HS-DPCCH transmit power may be based on $P_{DPCCH,target}$ and the greatest of ($D_{ACK}$+2), ($D_{NACK}$+2) and ($D_{CQI}$+2) when CQI of type A may be configured to be transmitted and the greatest of ($D_{ACK}$+2), ($D_{NACK}$+2) and ($D_{CQI}$+1) when CQI of type B may be configured to be transmitted (e.g. where $D_{ACK}$, $D_{NACK}$ and $D_{CQI}$ may be the most recent signalled values). Additionally, at TTI (n+1), the number of active cells mapped to HS-DPCCH (or HS-DPCCH2) may be 2 such that the estimated HS-DPCCH transmit power may be based on $P_{DPCCH,target}$ and the greatest of ($D_{ACK}$+1), ($D_{NACK}$+1) and ($D_{CQI}$+1) when CQI of type A may be configured to be transmitted and the greatest of ($D_{ACK}$+1), ($D_{NACK}$+1) and $D_{CQI}$ when CQI of type B may be configured to be transmitted (e.g. where $D_{ACK}$, $D_{NACK}$ and $D_{CQI}$ may be the most recent signalled values).

If an E-DCH TTI may be 10 ms, the number of active cells mapped to HS-DPCCH may change and accordingly the power offset setting for HS-DPCCH during the 10 ms TTI may change. In one embodiment, a UE may ignore such a change, and the estimated HS-DPCCH transmit power may be based on $P_{DPCCH,target}$ and the power offset setting for HS-DPCCH according to the latest UE cell activation status or the number of active cells mapped to HS-DPCCH (or HS-DPCCH$_2$ if HS-DPCCH$_2$ may be configured and transmitted in 8C-HSDPA, or HS-DPCCH$_k$ if k HS-DPCCH may be configured and transmitted in MC-HSDPA) before or when the UE may estimate HS-DPCCH transmit power at each 10 ms TTI. At the next 10 ms TTI (or subsequent TTI(, the estimated HS-DPCCH transmit power may be based on $P_{DPCCH,target}$ and the power offset setting for HS-DPCCH according to the latest UE cell activation status that may change during the previous 10 ms TTI and may be kept unchanged until or when a UE may estimate the HS-DPCCH transmit power at the current 10 ms TTI, or may change right before the UE may estimate HS-DPCCH transmit power at the current 10 ms TTI.

According to example embodiments, when more than one HS-DPCCH may be configured and transmitted in MC-HSDPA (e.g. 2 HS-DPCCHs may be configured and transmitted in 8C-HSDPA, denoted as HS-DPCCH and HS-DPCCH$_2$ (or HS-DPCCH2)), the number of active cells mapped to HS-DPCCH and HS-DPCCH2 may be different, and the power offset setting for HS-DPCCH and HS-DPCCH2 may be different at the same TTI or slot such that the estimated HS-DPCCH transmit power may be based on $P_{DPCCH,target}$ and the power offset setting for each individual HS-DPCCH (e.g. HS-DPCCH or HS-DPCCH$_2$) according to the latest UE cell activation status. Also, when the UE may be configured with DC-HSUPA, $P_{DPCCH,target}$ may refer to or define the estimated Primary Activated Frequency DPCCH power and the embodiments described above may be applied to estimate HS-DPCCH transmit power.

Although various embodiments may be described herein within the context of 8C-HSDPA in 3GPP UMTS wireless communications, the embodiments may be extended to MC-HSDPA with a different M value than 8, and may also be applied to any wireless technology with multiple carrier configuration such as carrier aggregation (CA) in LTE.

Additionally, throughout the document, "multi-carriers" and "multi-cells," and "secondary carriers" and "secondary cells" may be used interchangeably. The methods proposed herein may be applied to either the multi-carrier operations or multi-cell operations, and although some embodiments may be disclosed with reference to multi-carrier operations, they may be applicable for the multi-cell operations, and vice versa. The multi-cell operations may be implemented on the same frequency (e.g., carrier) or different frequencies.

Furthermore, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU), the WTRU comprising:
   a processor configured to:
      receive an order type and an order mapping via a high speed shared control channel (HS-SCCH) order;
      determine an activation status of closed loop transmit diversity (CLTD) and an activation status of single transmission based on the order type and the order mapping, wherein the order type comprises a first sequence of three bits '011' and the order mapping comprises a second sequence of three bits, and wherein the order type and different sequences of the order mapping indicate the activation status of CLTD and the activation status of single transmission; and based on the activation status of CLTD and the activation status of single transmission indicated by the order type and the order mapping:

activate CLTD and deactivate single transmission on each of a plurality of antennas, or deactivate CLTD and activate single transmission on one of the plurality of antennas.

2. The WTRU of claim 1, wherein the processor is configured to:

determine that the activation status of CLTD is active and the activation status of single transmission is inactive when the order mapping comprises a first sequence of three bits; and determine that the activation status of CLTD is inactive and the activation status of single transmission on one of a plurality of antennas is active when the order mapping comprises a second sequence of three bits.

3. The WTRU claim 1, wherein the processor is configured to determine that the activation status of CLTD is active and the activation status of single transmission is inactive when the sequence of three bits of the order mapping includes a value of '111'.

4. The WTRU of claim 1, wherein the processor is configured to determine that the activation status of CLTD is inactive and the activation status of single transmission on one of a plurality of antennas is active when the sequence of three bits of the order mapping includes a value of at least one of '101,' '110,' '001,' or '010'.

5. The WTRU of claim 1, wherein the processor being configured to determine the activation status of CLTD and the activation status of single transmission based on the order type and order mapping includes the processor being configured to:

compare the received order type with one or more order types in a mapping table;

compare the received order mapping with one or more order mappings in the mapping table;

access the activation status of CLTD and the activation status of single transmission if the received order type matches one of the one or more order types in the mapping table and the received order mapping matches one of the one or more order mappings in the mapping table; and signal the activation status of CLTD and the activation status of single transmission.

6. The WTRU of claim 1, wherein the processor being configured to activate single transmission on one of the plurality of antennas includes the processor being configured to activate single transmission with no secondary dedicated physical control channel (S-DPCCH) on one of the plurality of antennas, and wherein the processor being configured to deactivate single transmission on each of the plurality of antennas includes the processor being configured to deactivate single transmission with no S-DPCCH on each of the plurality of antennas.

7. A method for activating or deactivating uplink closed loop transmit diversity (CLTD) and activating or deactivating single transmission, the method comprising:

receiving an order type and an order mapping via a high speed shared control channel (HS-SCCH) order;

determining an activation status of CLTD and an activation status of single transmission based on the order type and the order mapping, wherein the order type comprises a first sequence of three bits '011' and the order mapping comprises a second sequence of three bits, and wherein the order type and different sequences of the order mapping indicate the activation status of CLTD and the activation status of single transmission; and based on the activation status of CLTD and the activation status of single transmission indicated by the order type and the order mapping:

activating CLTD and deactivating single transmission on each of a plurality of antennas, or deactivating CLTD and activating single transmission on one of the plurality of antennas.

8. The method of claim 7, further comprising:

determining that the activation status of CLTD is active and the activation status of single transmission is inactive when the order mapping comprises a first sequence of three bits; and determining that the activation status of CLTD is inactive and the activation status of single transmission on one of a plurality of antennas is active when the order mapping comprises a second sequence of three bits.

9. The method of claim 7, wherein determining the activation status of CLTD and the activation status of single transmission based on the order type and order mapping further comprises:

comparing the received order type with one or more order types in a mapping table;

comparing the received order mapping with one or more order mappings in the mapping table;

accessing the activation status of CLTD and the activation status of single transmission if the received order type matches one of the one or more order types in the mapping table and the received order mapping matches one of the one or more order mappings in the mapping table; and signaling the activation status of CLTD and the activation status of single transmission.

10. The method of claim 7, further comprising determining that the activation status of CLTD is active and the activation status of single transmission is inactive when the sequence of three bits of the order mapping includes a value of '111'.

11. The method of claim 7, further comprising determining that the activation status of CLTD is inactive and the activation status of single transmission on one of a plurality of antennas is active when the sequence of three bits of the order mapping includes a value of at least one of '101,' '110,' '001,' or '010'.

12. The method of claim 7, wherein activating single transmission on one of the plurality of antennas includes activating single transmission with no secondary dedicated physical control channel (S-DPCCH) on one of the plurality of antennas, and wherein deactivating single transmission on each of the plurality of antennas includes deactivating single transmission with no S-DPCCH on each of the plurality of antennas.

* * * * *